US008361323B2

United States Patent
Huang et al.

(10) Patent No.: US 8,361,323 B2
(45) Date of Patent: Jan. 29, 2013

(54) METHODS FOR USE OF ANILINE COPOLYMERS

(75) Inventors: Meirong Huang, Shanghai (CN); Hao Feng, Shanghai (CN); Xingui Li, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 13/481,656

(22) Filed: May 25, 2012

(65) Prior Publication Data
US 2012/0273425 A1    Nov. 1, 2012

Related U.S. Application Data

(63) Continuation of application No. 13/510,709, filed as application No. PCT/CN2011/073235 on Apr. 25, 2011.

(51) Int. Cl.
    *C02F 1/42*    (2006.01)
(52) U.S. Cl. ......... 210/674; 210/688; 525/535; 525/540
(58) Field of Classification Search .................. 210/674, 210/688; 525/535, 540
    See application file for complete search history.

(56) References Cited

PUBLICATIONS

Aksu, Equilibrium and kinetic modelling of cadmium(II) bioadsorption by *C. vulgaris* in a batch system: effect of temperature. Sep. Purif. Technol., 2001, 21:285-294.
Aziz et al. Heavy metals (Cd, Pb, Zn, Ni, Cu and Cr(III)) removal from water in Malaysia: Post treatment by high quality limestone. Bioresource Technology, 2008, 99:1578-1583.
Baniamerian et al. The effect of surface modification on heavy metal ion removal from water by carbon nanoporous adsorbent. Applied Surface Science, 2009, 256:1347-1354.
Bayramoglu et al., Removal of Cd(II), Hg(II), and Pb(II) ions from aqueous solution using p(HEMA/Chitosan) membranes. Journal of Applied Polymer Science, 2007, 106:169-177.
Bhadra et al., Progress in preparation, processing and applications of polyaniline. Progress in Polymer Science. 2009, 34:783-810.
Cao et al. Novel complex gel beads composed of hydrolyzed polyacrylamide and chitosan: An effective adsorbent for the removal of heavy metal from aqueous solution. Bioresource Technology, 2010, 101: 2558-2561.
Chen et al., Selective removal of Cu(II) ions by using cation-exchange resin-Supported polyethyleneimine (PEI) nanoclusters. Environ. Sci. Technol. 2010, 44:3508-3513.
Cleghorn et al. A polymer electrolyte fuel cell life test: 3 years of continuous operation Journal of Power Sources. 2006, 158(1):464-476.
Covelo et al. Simultaneous sorption and desorption of Cd, Cr, Cu, Ni, Pb, and Zn in acid soils II. Soil ranking and influence of soil characteristics. Journal of Hazardous Materials, 2007, 147:862-870.
Gospodinova et al., Conducting polymers prepared by oxidative polymerization: polyaniline. Progress in Polymer Science. 1998, 23:1443-1484.
Huang et al., Rapid and effective adsorption of lead ions on fine poly(phenylenediamine) microparticles. Chem. Eur. J. 2006, 12:4341-4350.
Huang et al., Efficient multicyclic adsorption and desorption of lead ions on facilely prepared poly(m-phenylenediamine) particles with extremely strong chemoresistance. Journal of Colloid and Interface Science. 2007, 313:72-79.
Huang et al. Longan shell as novel biomacromolecular sorbent for highly selective removal of lead and mercury Ions. Journal of Physical Chemistry B, 2010, 114(10): 3534-3542.
Kang et al., Polyaniline: A polymer with many interesting intrinsic redox states. Progress in Polymer Science. 1998, 23:277-324.
Alpoguz et al. Transport of Hg2+ through bulk liquid membrane using a bis-calix[4]arene nitrile derivative as carrier: kinetic analysis. New J. Chem., 2002, 26:477-480.

(Continued)

*Primary Examiner* — Chester Barry
(74) *Attorney, Agent, or Firm* — Knobbe, Martens, Olson & Bear LLP

(57) ABSTRACT

Aniline copolymers and methods of making these copolymers are disclosed herein. The copolymers can, for example, be used for removing metal ions from a sample.

22 Claims, 12 Drawing Sheets

PUBLICATIONS

Lam et al., Efficient approach for $Cd^{2+}$ and $Ni^{2+}$ removal and recovery using mesoporous adsorbent with tunable selectivity. Environ. Sci. Technol. 2007, 41:3329-3334.

Lassabatere et al. Retention of three heavy metals (Zn, Pb, and Cd) in a calcareous soil controlled by the modification of flow with geotextiles. Environ. Sci. Technol. 2004, 38:4215-4221.

Li et al. Facile synthesis and highly reactive silver Ion adsorption of novel microparticles of sulfodiphenylamine and diaminonaphthalene copolymers. Chem. Mater. 2005, 17: 5411-5419.

Li et al., Synthesis of electroconducting narrowly distributed nanoparticles and nanocomposite films of orthanilic acid/aniline copolymers. J. Comb. Chem. 2006, 8:174-183.

Li et al., Facile synthesis and optimization of conductive copolymer nanoparticles and nanocomposite films from aniline with sulfodiphenylamine. Chemistry- A European Journal, 2006, 12:1349-1359.

Li et al., Facile Synthesis and intrinsic conductivity of novel pyrrole copolymer nanoparticles with inherent selfstability. Journal of Physical Chemistry B, 2007, 111(21):5829-5836.

Li et al., Self-stabilized nanoparticles of intrinsically conducting copolymers from 5-sulfonic-2-anisidine. Small. 2008, 4:1201-1209.

Li et al. Strong adsorbability of mercury ions on aniline/sulfoanisidine copolymer nanosorbents. Chem. Eur. J. 2009, 15:4573-4581.

Li et al., Efficient synthesis of intrinsically conducting polypyrrole nanoparticles containing hydroxy sulfoaniline as key self-stabilized units. J. Phys. Chem. C., 2009, 113: 21586-21595.

Li et al., Redox adsorption and recovery of silver ions as silver nanocrystals on poly(aniline-co-5-sulfo-2-anisidine) nanosorbents. Chemistry-a European Journal. 2010, 16:10113-10123.

Li et al., Efficient and scalable synthesis of pure polypyrrole nanoparticles applicable for advanced nanocomposites and carbon nanoparticles, Journal of Physical Chemistry C, 2010, 114(45):19244-19255.

Liao et al., Carbon Nanotube/Polyaniline Composite Nanofibers: Facile Synthesis and Chemosensors. Nano Letters, 2011, 11:954-959.

Liu et al. Coating Fe3O4 magnetic nanoparticles with humic acid for high efficient removal of heavy metals in water. Environ. Sci. Technol., 2008, 42:6949-6954.

Lü et al., Synthesis and heavy-metal-ion sorption of pure sulfophenylenediamine copolymer nanoparticles with intrinsic conductivity and stability. Chem. Eur. J. 2007, 13:6009-6018.

Lü et al., Facile preparation and characterization of copolymer nanoparticles from pyrrole and aniline-2-sulfonic acid, Microchimica Acta, 2010, 171:341-347.

Ayad et al., Doping of polyaniline films with organic sulfonic acids in aqueous media and the effect of water on these doped films. European Polymer Journal. 2008, 44:3741-3747.

Mu, Synthesis and electronic properties of poly(aniline-co-2-amino-4-hydroxybenzensulfonic acid), J. Phys. Chem. B, 2008, 112: 6344-6349.

Mu, Electrocatalysis of NADH oxidation by naostrutured poly(aniline-co-2-amino-4-hydroxybenzensulfonic acid) and experimental evidence for the catalytic mechanism, Electrochemistry Communications, 2009, 11:1960-1963.

Neubauer et al., Heavy metal adsorption on clay minerals affected by the siderophore desferrioxamine B. Environ. Sci. Technol. 2000, 34: 2749-2755.

Qazi et al. A highly copper selective chromogenic calix[4]arene derivative. New J. Chem., 2010, 34:2579-2586.

Ramaprasad et al., Chitin—polyaniline blend as humidity sensor. Sensors and Actuators B. 2010, 148:117-125.

Rao et al., Removal and recovery of Cu(II), Cd(II) and Pb(II) ions from single and multimetal systems by batch and column operation on neem oil cake (NOC). Separation and Purification Technology, 2007, 57:394-402.

Sathiyanarayanan et al., Sulphonate doped polyaniline containing coatings for corrosion protection of iron. Surface & Coatings Technology. 2010, 204:1426-1431.

Sasaki et al., Stabilization of electronic properties of (1R)-10-camphorsulfonic acid doped polyaniline by UV irradiation. Polymer Degradation and Stability. 2007, 92:1408-1416.

Sharma et al., Microwave induced β-cyclodextrin modification of chitosan for lead sorption. International Journal of Biological Macromolecules, 2010, 47:410-419.

Song et al., Redox-active polypyrrole: toward polymer-based batteries. Adv. Mater. 2006, 18:1764-1769.

Toner et al., Zinc Adsorption by a bacterial biofilm. Environ. Sci. Technol. 2005, 39:8288-8294.

Wan et al., Adsorption of copper (II) and lead (II) ions from aqueous solution on chitosan-coated sand, Carbohyd. Polym. 2010, 80:891-899.

Wang et al., Characterizing the metal adsorption capability of a class F coal fly ash. Environ. Sci. Technol. 2004, 38:6710-6715.

Wingenfelder et al., Removal of heavy metals from mine waters by natural zeolites. Environ. Sci. Technol. 2005, 39:4606-4613.

Yang et al., Nanofibers of self-doped polyaniline. Polymer. 2005, 46:10688-10698.

Yang et al., Synthesis and high electrochemical activity of poly(aniline-co-2-amino-4-hydroxybenzenesulfonic acid), Electrochimica Acta 54, 2008, 506-512.

Yantasee et al., Removal of heavy metals from aqueous systems with thiol functionalized superparamagnetic nanoparticles. Environ. Sci. Technol., 2007, 41: 5114-5119.

Yin et al., Study of NMR properties on capped-structure of polyaniline. Journal of Northeast Normal University, 2007, 39:60-63.

Yoo et al., High contrast ratio and fast switching polymeric electrochromic films based on water-dispersible polyaniline-poly(4-styrenesulfonate) nanoparticles. Electrochemistry Communications. 2010, 12(1):164-167.

Yu et al., Characteristic of polyaniline redoped with camphor sulfonic acid on the UV-Vis Spectra. Chinese Journal of Spectroscopy Laboratory. 2002, 19:290-292.

Yu et al., Morphology and conductivity of polyaniline sub-micron fibers prepared by electrospinning. Materials Science and Engineering: B, 2008, 150:70-76.

Zhang et al., Study on the solubility of conducting polyaniline by introducing sulfonic group. Modern Plastics Processing and Applications. 2005, 17:9-11.

Zhang et al. Competitive adsorption of Cd, Cu, Hg and Pb by agricultural soils of the Changjiang and Zhujiang deltas in China. J. Zhejiang Univ. Sci. A, 2007 8(11):1808-1815.

International Search Report and Written Opinion dated Feb. 9, 2012 of PCT/CN/2011/073235 filed Apr. 25, 2011.

METHODS FOR USE OF ANILINE COPOLYMERS

BACKGROUND

1. Field

The present application relates to compositions and methods for removal of metal ions from a sample.

2. Description of the Related Art

The treatment of heavy metal pollution is challenge for environmental protection. Heavy metals, for example some toxic metal ions such as Hg(II), Pb(II), Cd(II), Cr(III, VI), can cause serious damages to living organisms. Traditional methods for heavy metal wastewater treatment, such as chemical precipitation, electrolytic process, extraction separation, and membrane separation, are limited in their applications because of the inability to detect metal ions at low concentrations. There is a need for potent adsorbents that remove metal ions from a sample.

SUMMARY

Some embodiments disclosed herein include a copolymer having at least one optionally substituted 2-hydroxy-5-sulfonic aniline as a first monomer unit and at least one aniline as a second monomer unit.

In some embodiments, the first monomer unit is represented by Formula I:

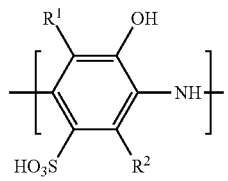

In some embodiments, $R^1$ is hydrogen or an electron-donating group, and $R^2$ is hydrogen or an electron-donating group. In some embodiments, $R^1$ is hydrogen and $R^2$ is hydrogen. In some embodiments, the electron-donating group is $C_{1-6}$ alkyl.

In some embodiments, the copolymer comprises at least about 5% of the first monomer unit by mole. In some embodiments, the copolymer comprises at least about 10% of the first monomer unit by mole. In some embodiments, the copolymer comprises about 20% of the first monomer unit by mole. In some embodiments, the copolymer has a molar ratio of the first monomer unit to the second monomer unit is about 1:99 to about 50:50. In some embodiments, the molar ratio of the first monomer unit to the second monomer unit is about 20:80.

Some embodiments disclosed herein include a composition comprising submicroparticles, wherein the submicroparticles comprise any one or more copolymer disclosed in the present application. In some embodiments, the submicroparticles have an average size of about 50 nm to about 5 μm. In some embodiments, the submicroparticles have an average bulk electrical conductivity of about $10^{-7}$ S/cm to about 100 S/cm. In some embodiments, the submicroparticles have an average surface size of about 1 $m^2/g$ to about 500 $m^2/g$. In some embodiments, the submicroparticles have an average pore diameter of about 1 nm to about 500 nm.

Some embodiments disclosed herein include a method of making a copolymer, the method include forming a composition comprising at least one oxidizing agent, at least one optionally substituted 2-hydroxy-5-sulfonic aniline monomer, and at least one aniline monomer; and maintaining the composition under conditions effective to polymerize the 2-hydroxy-5-sulfonic aniline monomer and the aniline monomer to form the copolymer. In some embodiments, the first monomer unit is represented by Formula I:

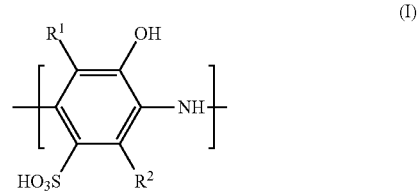

In some embodiments, R' is hydrogen or an electron-donating group, and $R^2$ is hydrogen or an electron-donating group. In some embodiments, the oxidizing agent is selected from the group consisting of ammonium persulfate, sodium persulfate, potassium persulfate, $FeCl_3$, potassium iodate, $Na_3VO_4$, benzoyl peroxide (BPO), and any combination thereof. In some embodiments, the oxidizing agent is ammonium persulfate. In some embodiments, the molar ratio of the optionally substituted 2-hydroxy-5-sulfonic aniline monomer to the aniline monomer is about 1:99 to about 50:50. In some embodiments, the molar ratio of the optionally substituted 2-hydroxy-5-sulfonic aniline monomer to the aniline monomer is about 20:80. In some embodiments, the molar ratio of the oxidizing agent to a total amount of monomer components in the composition is about 0.5:1 to about 5:1. In some embodiments, the molar ratio of the oxidizing agent to a total amount of monomer components in the composition is about 1:1. In some embodiments, the composition is maintained at a temperature of about 0° C. to about 100° C. In some embodiments, the composition is maintained at a temperature of about 30° C.

In some embodiments, forming the composition comprises combining a first solution comprising a first solvent and the oxidizing agent; and a second solution comprising a second solvent, the optionally substituted 2-hydroxy-5-sulfonic aniline monomer, and the aniline monomer, wherein the optionally substituted 2-hydroxy-5-sulfonic aniline monomer and the aniline monomer are soluble in the first and second solvents. In some embodiments, the second solvent is an acidic aqueous medium. In some embodiments, the acidic aqueous medium comprises an acid selected from the group consisting of HCl, $HNO_3$, $H_2SO_4$, $HClO_4$, $H_3PO_4$, $H_5IO_6$, $CH_3COOH$, and any combination thereof. In some embodiments, the maintaining step is performed for about 2 hours to about 48 hours.

Some embodiments disclosed herein include a method for removing a metal ion from a sample, the method include providing (a) an untreated sample suspected of containing the metal ion; and (b) contacting the untreated sample and a composition to form a treated sample, wherein the composition comprises a copolymer comprising at least one optionally substituted 2-hydroxy-5-sulfonic aniline as a first monomer unit and at least one aniline as a second monomer unit. In some embodiments, the first monomer unit is represented by Formula I:

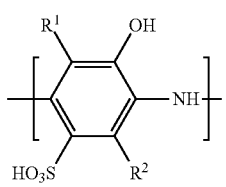

(I)

In some embodiments, R' is hydrogen or an electron-donating group, and $R^2$ is hydrogen or an electron-donating group.

In some embodiments, the metal ion is a heavy metal ion. In some embodiments, the metal ion is Pb(II) or Hg(II). In some embodiments, the metal ion is a noble metal ion. In some embodiments, the metal ion is Ag(I). In some embodiments, the metal ion is selected from the group consisting of Cd(II), Cu(II), Zn(II), Pb(II), Hg(II), and Fe(III). In some embodiments, the untreated sample is wastewater. In some embodiments, the concentration of the metal ion in the untreated sample is no more than about 200 g/L. In some embodiments, the concentration of the metal ion in the untreated sample is from about 1 ng/L to about 200 mg/L. In some embodiments, the concentration of the metal ion in the untreated sample is higher than the concentration of the metal ion in the treated sample. In some embodiments, the concentration of the metal ion in the untreated sample is at least about 5 times higher than the concentration of the metal ion in the treated sample. In some embodiments, the concentration of the metal ion in the untreated sample is at least about 10 times higher than the concentration of the metal ion in the treated sample. In some embodiments, the concentration of the metal ion in the untreated sample is at least about 20 times higher than the concentration of the metal ion in the treated sample. In some embodiments, the concentration of the metal ion in the treated sample is less than about 30% of the concentration of the metal ion in the untreated sample. In some embodiments, the concentration of the metal ion in the treated sample is less than about 15% of the concentration of the metal ion in the untreated sample. In some embodiments, the concentration of the metal ion in the treated sample is less than about 1% of the concentration of the metal ion in the untreated sample.

In some embodiments, the method further comprises separating the copolymer from the treated sample. In some embodiments, the method further comprises contacting the separated copolymer with a chelating agent to form a regenerated copolymer, where the amount of metal ions in the regenerated copolymer is less than the amount of metal ions in the separated copolymer. In some embodiments, the method further comprises contacting a second untreated sample suspected of containing metal ions with the regenerated copolymer. In some embodiments, the chelating agent is a polyamino carboxylic acid. In some embodiments, the chelating agent is selected from ethylenediaminetetraacetic acid (EDTA), diethylenetriaminepentaacetic acid (DTPA), N-(2-hydroxyethyl)ethylenediamine-N,N',N'-triacetic acid (HEDTA), glycol-bis-(2-aminoethylether)-N,N,N',N'-tetraacetic acid (EGTA), ethylenediamine-N,N'-bis((2-hydroxyphenyl)acetic acid) (EDDHA), and mixtures thereof.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 2 shows the SEM images of the AN/HSA copolymer submicroparticles.

DETAILED DESCRIPTION

Figure 1:
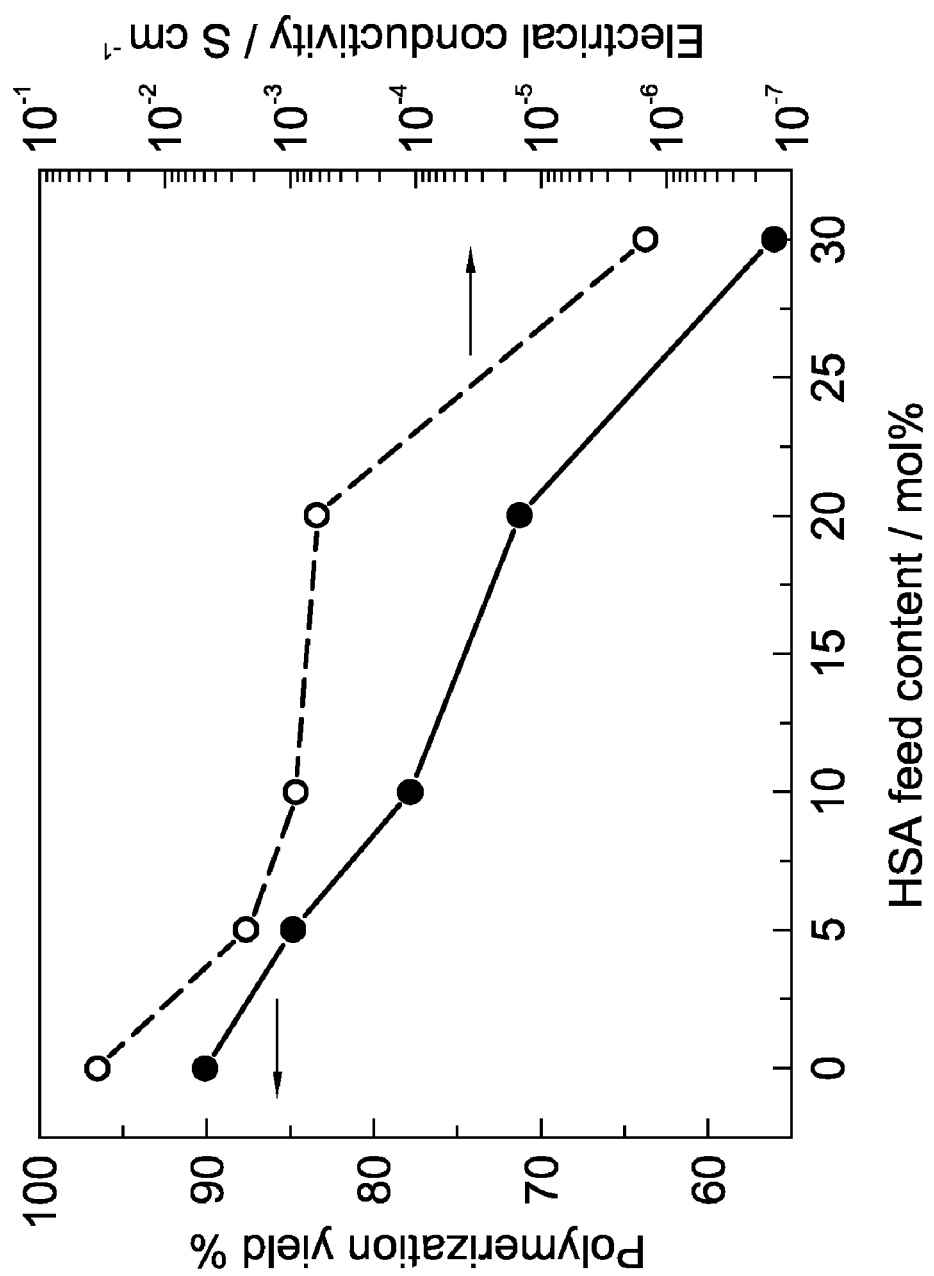
FIG. 1 shows the polymerization yield and bulk electrical conductivity of the HCl-doped aniline/2-hydroxy-5-sulfonic aniline (AN/HSA) copolymers as a function of HSA feed content.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are copolymers having at least one optionally substituted 2-hydroxy-5-sulfonic aniline as a first monomer unit and at least one aniline as a second monomer unit. In some embodiments, the first monomer unit is represented by Formula I:

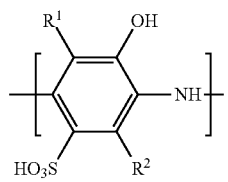

(I)

Also disclosed herein are compositions having one or more of the copolymers disclosed in the present application. The copolymer can be used, for example, removing metal ions from a sample. Also disclosed herein are methods of making the copolymer. The methods can, in some embodiments, include standard polymerization procedures that may be easily scaled for manufacturing purposes. The present application also includes methods of using the copolymer.

DEFINITIONS

As used herein, the term "electron donating" refers to the ability of a substituent to donate electrons relative to that of hydrogen if the hydrogen atom occupied the same position in the molecule. This term is well understood by one skilled in the art and discussed in Advanced Organic Chemistry by M. Smith and J. March, John Wiley and Sons, New York N.Y. (2007). Non-limiting examples of electron donating group include —$CH_3$, —$CH_2CH_3$, —OH, —$OCH_3$, —$OCH_2CH_3$, —$N(CH_3)_2$, —$N(CH_2CH_3)_2$, and —SH.

As used herein, "alkyl" refers to a straight or branched hydrocarbon chain that comprises a fully saturated (no double or triple bonds) hydrocarbon group. The alkyl group of the compounds may be designated as "$C_1$-$C_4$ alkyl" or similar designations. By way of example only, "$C_1$-$C_4$ alkyl" indicates that there are one to four carbon atoms in the alkyl chain, i.e., the alkyl chain is selected from methyl, ethyl, propyl, iso-propyl, n-butyl, iso-butyl, sec-butyl, and tert-butyl. Typical alkyl groups include, but are in no way limited to, methyl, ethyl, propyl, isopropyl, butyl, isobutyl, tertiary butyl, pentyl, hexyl, and the like. The alkyl group may be substituted or unsubstituted.

As used herein, "BET specific surface area" refers to the specific surface area of a material that is measured by nitrogen multilayer adsorption measured as a function of relative pressure using a method based on the Brunauer-Emmett-Teller theory (Brunauer et al. "Adsorption of Gases in Multimolecular Layers", J. Am. Chem. Soc., 1938, 60(2):309-319). Analyzers and testing services are commercially available from various sources including CERAM (Staffordshire, UK).

Aniline Copolymer Materials

Some embodiments disclosed herein include a copolymer having at least one optionally substituted 2-hydroxy-5-sulfonic aniline as a first monomer unit and at least one aniline as a second monomer unit. In some embodiments, the first monomer unit is represented by Formula I:

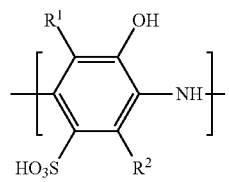

(I)

In some embodiments, $R^1$ is hydrogen or an electron-donating group, and $R^2$ is hydrogen or an electron-donating group. In some embodiments, $R^1$ is hydrogen and $R^2$ is hydrogen. In some embodiments, the electron-donating group is $C_{1-6}$ alkyl. In some embodiments, the first monomer unit is 2-hydroxy-5-sulfonic aniline represented by Formula II:

(II)

In some embodiments, the electron-donating group is —$CH_3$, —$CH_2CH_3$, —OH, —$OCH_3$, —$OCH_2CH_3$, —$N(CH_3)_2$, —$N(CH_2CH_3)_2$, or —SH.

In some embodiments, the copolymer comprises at least about 5%, at least 10%, at least 20%, at least 30%, at least 40%, or at least 50% of the first monomer unit by mole. In some embodiments, the copolymer comprises at least about 10% of the first monomer unit by mole. In some embodiments, the copolymer comprises about 20% of the first monomer unit by mole. In some embodiments, the molar ratio of the first monomer unit to the second monomer unit in the copolymer is about 1:99, about 5:95, about 10:90, about 20:80, about 30:70, about 40:60, about 50:50, or ranges between any two of these values. In some embodiments, the molar ratio of the first monomer unit to the second monomer unit is about 20:80.

Compositions Including Aniline Copolymers

Some embodiments disclosed herein include a composition having submicroparticles, wherein the submicroparticle include any one or more copolymers described in the present application. In some embodiments, the copolymer has at least one optionally substituted 2-hydroxy-5-sulfonic aniline as a first monomer unit and at least one aniline as a second monomer unit.

The total amount of the copolymer in the composition is not particularly limited and can vary depending upon the desired use. For example, a relatively small amount of the copolymer can be used for certain applications to remove metal ions that are discussed further below. The total amount of the copolymer in the composition can, for example, be at least about 1% by weight; at least about 2% by weight; at least about 5% by weight; at least about 10% by weight; at least about 15% by weight; at least about 20% by weight. The total amount of the copolymer in the composition may, for example, be less than or equal to about 100% by weight, less than or equal to about 99% by weight; less than or equal to about 90% by weight; less than or equal to about 70% by weight; less than or equal to about 50% by weight; less than or equal to about 30% by weight; less than or equal to about 10% by weight; less than or equal to about 5% by weight, or less than or equal to about 1% by weight.

The composition can, in some embodiments, be in the form of a liquid that includes one or more of the copolymers described in the present application. For example, the copolymer can be dispersed or dissolved in a solvent. The solvent can be an organic solvent or water. The organic solvent may, for example, be a non-polar solvent, a polar aprotic solvent, a polar protic solvent, or combinations thereof. In some embodiments, the composition includes a polar aprotic solvent. Non-limiting examples of polar aprotic solvents include n-methyl-2-pyrrolidone (NMP), dimethylformamide (DMF), dimethyl sulfoxide (DMSO), and tetrahydrofuran (THF).

The composition can, in some embodiments, be in the form of a solid that includes one or more of the copolymers described in the present application. In some embodiments, a solid form of the copolymer can be obtained by precipitating or drying the copolymer from solution (e.g., solvent casting). The solid composition can include amorphous or semi-crystalline forms of the copolymer. In some embodiments, the copolymer can be blended with one or more polymers. Generally, any inert polymer can be blended with the copolymer; such inert polymers can be, for example, acrylics, polyolefins, polyamides, polyesters, polysulfones, fluoropolymers, vinyl polymers, and the like. The amount of the copolymer in the composition is not particularly limited and can be, for example, at least about 10% by weight; at least about 30% by weight; at least about 50% by weight; at least about 60% by weight; at least about 70% by weight; at least about 80% by weight; at least about 90% by weight; at least about 95% by weight; at least about 97% by weight; or at least about 99% by weight.

The copolymer particles can have various sizes. For example, the copolymer particles can have a size of about 50 nm to about 5 μm, a size of about 100 nm to about 2 μm, a size of about 150 nm to about 1 μm, a size of about 200 nm to about 800 nm, a size of about 250 nm to about 600 nm, or a size of about 300 nm to about 500 nm. In some embodiments, the copolymer particles have a size of about 150 nm to about 2.5 μm. In some embodiments, the copolymer particles have a size of about 300 nm to about 2 μm. In some embodiments, the copolymer particles have a size of about 500 nm to about 1 μm.

The composition can, in some embodiments, exhibit electrical conductivity. For example, the composition can exhibit a conductivity of about $1\times10^{-7}$ S/cm to about 100 S/cm. In some embodiments, the composition can exhibit a conductivity of about $1\times10^{-3}$ S/cm$^{-1}$ to about $1\times10^{-2}$ S/cm$^{-1}$. The composition can, in some embodiments, exhibit electrical conductivity when doped with an effective amount of dopant. For example, the composition can exhibit a conductivity of about $0.8\times10^{-3}$ S/cm$^{-1}$ when doped with HCl. Non-limiting examples of dopants include halogenated compounds, such as iodine, bromine, chlorine, iodine trichloride; protonic acids such as sulfuric acid, hydrochloric acid, nitric acid, perchloric acid; Lewis acids, such as aluminum trichloride, ferric trichloride, molybdenum chloride; and organic acids, such acetic acid, trifluoracetic acid, and benzenesulfonic acid. In some embodiments, the dopant is HCl.

The copolymer particles can have various average BET specific areas. For example, the copolymer particles can have an average BET specific area of about 1 m$^2$/g to about 500 m$^2$/g, about 2 m$^2$/g to about 200 m$^2$/g, about 5 m$^2$/g to about 100 m$^2$/g, about 10 m$^2$/g to about 50 m$^2$/g, about 15 m$^2$/g to about 40 m$^2$/g, or about 20 m$^2$/g to about 30 m$^2$/g. In some embodiments, the copolymer particles have an average BET specific area of about 22 m$^2$/g to about 25 m$^2$/g. In some embodiments, the copolymer particles have an average BET specific area of about 22 m$^2$/g.

The copolymer particles can have various average pore diameters. For example, the copolymer particles can have an average pore diameter of about 1 nm to about 500 nm, about 10 nm to about 450 nm, about 20 nm to about 400 nm, about 30 nm to about 350 nm, about 40 nm to about 300 nm, about 50 nm to about 250 nm, or about 75 nm to about 200 nm. In some embodiments, the copolymer particles have an average pore diameter of about 75 nm to about 200 nm.

In some embodiments, the average molecular weight of the copolymer is from about 500 g/mol to about 2000 g/mol. In some embodiments, the average molecular weight of the one or more polyanthrylenes is from about 800 g/mol to about 1500 g/mol.

Method of Making Copolymers

Some embodiments disclosed herein include a method of making a copolymer. Any one or more of the copolymers described in the present application can be prepared using this process. The method can include, for example, forming a composition comprising at least one oxidizing agent, at least one optionally substituted 2-hydroxy-5-sulfonic aniline monomer and at least one aniline monomer; maintaining the composition under the conditions effective to polymerize the optionally substituted 2-hydroxy-5-sulfonic aniline monomer and the aniline monomer to form the copolymer. In some embodiments, the optionally substituted 2-hydroxy-5-sulfonic aniline monomer is represented by Formula I:

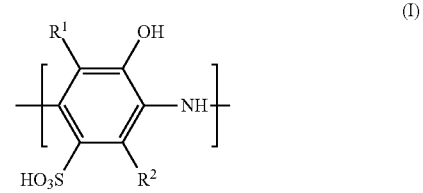

wherein R$^1$ and R$^2$ are as previously defined in the present application. In some embodiments, the first monomer unit is 2-hydroxy-5-sulfonic aniline represented by Formula II:

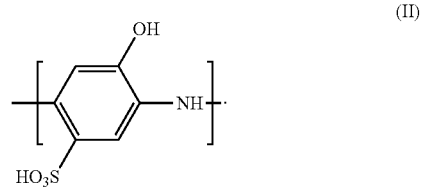

The steps and/or conditions for forming the copolymer are not particularly limited. Any suitable method of combining the ingredients is within the scope of the present application. For example, the oxidizing agent can be combined (e.g., mixed or dissolved) in a first solvent, and the optionally substituted 2-hydroxy-5-sulfonic aniline monomer and the aniline monomer can be combined (e.g., mixed or dissolved) in a second solvent. The solution can then be combined by dropwise or continuous addition of one of the mixtures to the other. The first and second solvents can be the same or different. In some embodiments, the first solvent is at least partially immiscible in the second solvent. In some embodiments, the oxidizing agent is soluble in the first solvent. In some embodiments, the first solvent is distilled water. In some embodiments, both the optionally substituted 2-hydroxy-5-sulfonic aniline monomer and the aniline monomer are soluble in the second solvent. Without being bound to any specific theory, but it is believe that the solvent used for polymerization owns the ability to offer H$^+$, which allows the monomer components (for example, the aniline monomer and the 2-hydroxy-5-sulfonic aniline monomer) to be protonated to copolymerize. In some embodiments, the second solvent is an acid aqueous medium, for example an aqueous medium containing organic and/or inorganic acids. Examples of acid include, but are not limited to, HCl, $HNO_3$, $H_2SO_4$, $HClO_4$, $H_3PO_4$, $H_5IO_6$, $CH_3COOH$, and any combination thereof. The pH of the aqueous medium can be, for example, less than or equal to about 6; less than or equal to about 5; less than or equal to about 4; or less than or equal to about 3. As one example, the polymerization solvent can include a protonic acid, such as 1M HCl. And various pH modifying agents can be used to adjust and/or maintain the pH of the composition to a desired pH.

Various oxidative agents can be used. Examples of the oxidizing agent include, but are not limited to, ammonium salts (such as ammonium persulfate), sodium persulfate, potassium persulfate, $FeCl_3$, potassium iodate, $Na_3VO_4$, benzoyl peroxide (BPO), or combinations thereof. In some embodiments, the oxidizing agent is ammonium persulfate.

The molar ratio of the oxidizing agent to the monomer components in the composition can be modified, for example, to adjust the properties of the copolymer. The relative molar ratio of the oxidizing agent to the monomer components in the composition can be, for example, at least about 0.1:1, at least about 0.5:1, at least about 1:1, at least about 1.5:1, at least about 2:1, at least about 2.5:1, at least about 3:1, at least about 3.5:1, at least about 4:1, at least about 4.5:1, or at least about 5:1. The relative molar ratio of the monomer components to the oxidizing agent in the composition can be, for example, less than or equal to about 5:1, less than equal to about 4.5:1, less than or equal to about 4:1, less than equal to about 3:1, less than equal to about 2:1, or less than equal to about 1:1. In some embodiments, the relative molar ratio of the oxidizing agent to the monomer components is about 1:1.

After forming the composition having the optionally substituted 2-hydroxy-5-sulfonic aniline monomer, the aniline monomer and oxidizing agent, the composition can be maintained at conditions effective to polymerize the monomer components to form the copolymer. For example, the composition can be maintained at about atmospheric pressure and a temperature of about 0° C. to about 100° C., about 5° C. to about 80° C., about 10° C. to about 60° C., about 15° C. to about 50° C., about 20° C. to about 40° C., or about 25° C. to about 35° C. In some embodiments, the temperature can be about 15° C. to about 25° C. In some embodiments, the temperature can be about 30° C. Non-limiting examples of polymerization temperature include about 15° C., about 20° C., about 25° C., about 30° C., about 35° C., about 40° C., about 45° C., about 50° C., and ranges between any two of these values.

The composition having the optionally substituted 2-hydroxy-5-sulfonic aniline monomer, the aniline monomer and oxidizing agent can be maintained at the conditions for a period of time sufficient to obtain the copolymer. The composition, for example, can be maintained at the conditions for about 2 hours to about 48 hours. In some embodiments, the composition is maintained at the conditions for at least about 1 hour, at least about 2 hours, at least about 6 hours, at least about 12 hours, at least about 18 hours, at least about 24 hours, at least about 30 hours, at least about 36 hours, at least about 42 hours, at least about 48 hours, at least about 60 hours, and ranges between any two of these values. In some embodiments, the composition is maintained at the conditions for about 2 hours to about 48 hours. In some embodiments, the composition is maintained at the conditions for about 24 hours.

The method can also optionally include isolating the copolymer from the composition. For example, the copolymer can be isolated by centrifuging the composition to obtain one or more copolymers within the precipitate. The copolymer can be subject to various other optional treatments, such as washing, doping, dedoping, and the like.

The yield of the copolymer using the method will vary depending upon various factors, such as the temperature and the like. In some embodiments, the method yields at least about 50% by weight of copolymer relative to a total amount of the monomer components in the composition. In some embodiments, the method yields at least about 60% by weight of copolymer relative to a total amount of the monomer components in the composition. In some embodiments, the method yields at least about 70% by weight of the copolymer relative to a total amount of the monomer components in the composition. In some embodiments, the method yields at least about 80% by weight of the copolymer relative to a total amount of the monomer components in the composition. In some embodiments, the method yields at least about 90% by weight of the copolymer relative to a total amount of the monomer components in the composition.

Methods for Removing Metal Ions from a Sample

Some embodiments of the present application include methods for removing metal ions from a sample. In some embodiments, a method for removing metal ions from a sample includes: (a) providing an untreated sample suspected of containing one or more metal ions; and (b) contacting the sample and a composition to form a treated sample, wherein the composition comprises a copolymer comprising at least one optionally substituted 2-hydroxy-5-sulfonic aniline as a first monomer unit and at least one aniline as a second monomer unit.

Non-limiting examples of metal ions that can be removed using the methods disclosed in the present application include heavy metal ions, noble metal ions, nutritious metal ions, and ions of rare earth metal. Examples of heavy metal ion include As(III), As(V), Cd(II), Cr(VI), Pb(II), Hg(II), Sb(III), Sb(V), Ni(II), Ag(I) and Tl(III). Examples of nutritious metal ion include K(I), Na(I), Ca(II), Mg(II), Fe(II), Fe(III), Zn(II), Cu(II), and Ca(II). Examples of noble metal ions are Ag(I), Au(I), Au(III), Pt(II), Pt(IV), Ir(III), Ir(IV), Ir(VI), Pd(II), and Pd(IV). Examples of ions of rare earth metal are La(III), Pr(III), Nd(III), Sm(III), Gd(III), Dy(III), Y(III), and Er(III). In some embodiments, the metal ion is Pb(II). In some embodiments, the metal ion is Hg(II). In some embodiments, the metal ion is Cu(II) or Au(I). In some embodiments, the metal ion is Fe(III) or Zn(II). In some embodiments, the metal ion is Au(I).

Various types of samples can be treated by the copolymer as described in the present application for removing metal ions. In some embodiments, the sample is an aqueous sample. In some embodiments, the untreated sample is wastewater. In some embodiments, the untreated sample is sewage, plant discharge, groundwater, polluted river water, industrial waste, battery waste, electroplating wastewater, liquid waste in chemical analysis, or laboratory waste. In some embodiments, the wastewater is generated from industrial factories such as printery, non-ferrous metal manufacturing, mining, smelting, electrolysis, electroplating, chemicals, medicine, paint and pigment. In some embodiments, the untreated sample is automotive exhaust. The concentration of the metal ion in the untreated sample can be from about 1 ng/L to about 200 g/L, from about 10 ng/L to about 100 g/L, from about 100 ng/L to about 50 g/L, from about 1 μg/L to about 10 g/L, from about 10 μg/L to about 5 g/L, from about 100 μg/L to about 1 g/L, from 1 mg/L to about 0.5 g/L, from about 5 mg/L to about 0.1 g/L, or from about 10 mg/L to about 0.05 g/L. In some embodiments, the concentration of the metal ion in the untreated sample is no more than about 200 g/L, no more than 100 g/L, no more than 50 g/L, no more than 5 g/L, no more than 1 g/L, no more than 0.5 g/L, no more than 0.1 g/L, no more than 0.05 g/L, no more than 0.01 g/L, no more than 0.005 g/L, no more than 1 mg/L or less. In some embodiments, the concentration of the metal ion is from about 0.01 mg/L to about 500 mg/L. In some embodiments, the concentration of the metal ion is from about 0.1 mg/L to about 200 mg/L. In some embodiments, the concentration of the metal ion is from about 1 ng/L to about 200 mg/L. In some embodiments, the concentration of the metal ion in the untreated sample is about 200 mg/L. In some embodiments, the concentration of the metal ion in the untreated sample is about 20 mg/L. In some embodiments, the concentration of the metal ion in the untreated sample is about 0.1 mg/L. In some embodiments, the concentration of the metal ion in the untreated sample is about 1 ng/L.

The copolymer described in the present application can be potent adsorbents for metal ions. For example, the removal percentage of a metal ion in a sample can be at least about 20% by weight, at least about 30% by weight, at least about 40% by weight, at least about 50% by weight, at least about 60% by weight, at least about 70% by weight, at least about 80% by weight, at least about 90% by weight, at least about 95% by weight, or at least about 99% by weight. In some embodiments, the removal percentage of the metal ion is at least about 85%. In some embodiments, the removal percentage of the metal ion is at least about 90% by weight. In some embodiments, the removal percentage of the metal ion is at least about 95% by weight. In some embodiments, the removal percentage of the metal ion is at least about 99% by weight. In some embodiments, the removal percentage of the metal ion is at least about 99.5% by weight. In an idealized embodiment, the removal percentage of the metal ion is 100% by weight.

Various amount of the copolymer can be used to remove a metal ion from a sample. The copolymer can be added to the untreated sample at a concentration of, for example, at least about 0.001 mg/mL; at least about 0.01 mg/mL; at least about 0.1 mg/mL; at least about 1 mg/mL; at least about 5 mg/mL; at least about 10 mg/mL; at least about 50 mg/mL; at least about 100 mg/mL; at least about 500 mg/mL; at least about 1 g/mL; or at least about 5 g/mL. The copolymer can be added to the untreated sample at a concentration of, for example, less than or equal to about 500 mg/mL; less than or equal to about 100 mg/mL; less than or equal to about 50 mg/mL; less than or equal to about 10 mg/mL; less than or equal to about 5 mg/mL; less than or equal to about 1 mg/mL; less than or equal to about 0.1 mg/mL; less than or equal to about 0.01 mg/mL; or less than or equal to about 0.001 mg/mL.

In some embodiments, the untreated sample has a higher concentration of the metal ion than the treated sample. For example, the concentration of the metal ion in the untreated sample can be, for example, at least about 5 times higher, at least about 10 times higher, at least about 15 times higher, at least about 20 times higher, at least about 25 times higher, at least about 30 times higher, at least about 35 times higher, at least about 40 times higher, at least about 45 times higher, at least about 50 times higher, at least about 60 times higher, or at least about 100 times higher, than the concentration of the metal ion in the treated sample. The concentration of the metal ion in the treated sample can be less than, for example, about 30%, about 25%, about 20%, about 15%, about 10%, about 5%, about 4%, about 3%, about 2%, about 1%, about 0.5%, about 0.2%, about 0.1%, about 0.05%, or about 0.01% of the concentration of the metal ion in the untreated sample.

The sample can be, in some embodiments, in contact with the composition containing the copolymer for various period of time. For example, the sample can be in contact with the composition for from about 0.01 hour to about 100 hours; from about 0.1 hour to about 50 hours; from about 1 hour to about 40 hours; from about 5 hours to about 24 hours; or from about 10 hour to about 12 hours. In some embodiments, the sample is in contact with the composition for about 5 minutes, about 10 minutes, about 15 minutes, about 20 minutes, about 30 minutes, about 40 minutes, about 50 minutes, about 60 minutes, about 75 minutes, or longer. In some embodiments, the sample is in contact with the composition for about 24 hours. In some embodiments, the sample is in contact with the composition for about 1 hour. In some embodiments, the adsorption time at equilibrium is about 1 hour. In some embodiments, the adsorption time at equilibrium is about 40 minutes. In some embodiments, the adsorption time at equilibrium is at most about 30 minutes, at most about 1 hour, at most about 2 hours, or at most about 5 hours.

The temperature of the sample while contacting the composition containing the copolymer can be varied. The temperature can be, for example, in the range of about 0° C. to about 60° C. In some embodiments, the temperature is about 30° C. In some embodiments, the sample may be heated above room temperature. In some embodiments, the sample can be maintained at a selected temperature while the composition containing the copolymer contacts the untreated sample.

The method can also optionally include separating the copolymer from the treated sample. Various methods of separating the copolymer can be used, such as filtering or centrifuging. As one example, after the copolymer has contacted the untreated sample for sufficient time to adsorb metal ions, the sample can be filtered to remove the copolymer. The filter can, for example, be configured to remove particles containing the copolymer.

In some embodiments, the metal ion that has been adsorbed by the copolymer can be removed from the copolymer. The method can also optionally include contacting the separated copolymer with a chelating agent to form a regenerated copolymer, wherein the amount of metal ions in the regenerated copolymer is less than the amount of metal ions in the separated copolymer. Various chelating agents can be used to release the metal ions from the separate copolymer and regenerate the copolymer. Non-limiting examples of chelating agent include a polyamino carboxylic acid, a protonic acid (such as nitric acid), diethylenetriaminepentaacetic acid (DTPA), N-(2-hydroxyethyl)ethylenediamine-N,N',N'-triacetic acid (HEDTA); glycol-bis-(2-aminoethylether)-N,N,N',N'-tetraacetic acid (EGTA); ethylenediamine-N,N'-bis((2-hydroxyphenyl)acetic acid) (EDDHA).

The copolymer can be repeatedly regenerated for removing metal ions. In some embodiments, the copolymer can maintain an adsorptivity of about 50%, 60%, 70%, 80%, 90%, or 95% to the metal ions after being recycled for about 3 times, about 5 times, about 8 times, about 10 times, about 15 times, about 20 times, about 25 times, or about 30 times. In some embodiments, the copolymer can maintain an adsorptivity of at least about 85% after being recycled for about 3 times, about 5 times, about 8 times, about 10 times, about 15 times, or about 20 times. In an idealized embodiment, the adsorptivity of the copolymer is 100% to the metal ions after being recycled for about 3 times, about 5 times, about 8 times, about 10 times, about 15 times, about 20 times, about 25 times, or about 30 times.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

EXAMPLES

Additional embodiments are disclosed in further detail in the following examples, which are not in any way intended to limit the scope of the claims.

Example 1

Polymerization of Aniline (AN) and 2-hydroxy-5-sulfonic aniline (HSA)

The chemical oxidative polymerization of Aniline (AN) and 2-hydroxy-5-sulfonic aniline (HSA) for the synthesis of An/HSA copolymers was carried out in a typical synthesis procedure described below.

A typical synthesis procedure of AN/HSA copolymers included adding 0.729 mL AN and 0.378 g HSA so that the molar ratio of the AN monomer to the HSA monomer (AN/HSA molar ratio) was about 20:80, and mixing AN and HSA in a 200-mL glass flask which contained 100 mL HCl solution with concentration of 1M. Next, 2.28 g oxidant ammonium persulfate was dissolved separately in 50 mL of distilled water to prepare as an oxidant solution. The oxidant solution was gradually dropped into the mixed monomer solution at a rate of one drop of every 3 seconds at 25° C. with a final monomer components/oxidant molar ratio of 1:1. The reaction mixture was vigorously magnetically stirred for 24 hour at 30° C. When the synthetic procedure is completed, resulting AN/HSA copolymer precipitates were filtered and washed thoroughly with water and ethanol to remove residual oxidant, water-soluble oligomers, and byproducts. Then, the solid copolymer submicroparticles in a virgin salt (acid doped state) were left to dry in an oven at 40° C. for 3 days till constant weight. Yield was calculated based on the weight of the copolymer. The oxidative copolymerization reaction is shown in Scheme I.

Scheme I

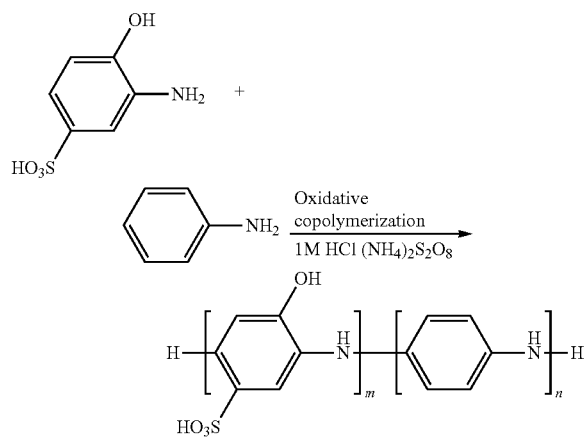

Example 2

Modifying Polymerization Conditions

Additional AN/HSA copolymers were prepared using the typical procedures described in Example 1. However, in one set of experiments, AN/HSA molar ratio varied from 100:0 to 70:30 (i.e., HSA feed content was increased from 0% to 30%). The synthetic yields of those AN/HSA copolymers were determined based on the weight of the copolymer. The bulk electrical conductivity of the pressed copolymer pellet sheets with the thicknesses of 0.20 mm and a constant efficient area of 0.785 cm$^2$ was examined by a two-disk method at room temperature with a UT 70A multimeter. The results are shown in FIG. 1.

FIG. 1 shows that an increase in the HSA feed content leads to a reduction in the synthetic yield and the electrical conductivity of the AN/HSA copolymer. Also, as compared to polyaniline homopolymer, the bulk electrical conductivity of the AN/HSA copolymer does not change significantly when the molar ratio of the HSA monomer to the AN monomer is changed from 5:95 to 20:80.

Example 3

Solubility Property of AN/HSA Copolymers

Additional AN/HSA copolymer particles were prepared using generally the same procedures described in Example 1. However, AN/HSA molar ratio was 95:5, 90/10, 80/20, and 70:30, respectively. Chemoresistance of the copolymer particles was evaluated using a typical procedure including: adding 5 mg copolymer powders into 1 mL solvent and dispersing the mixture thoroughly; and characterizing the solubility of the copolymer after swaying the mixture continuously for 24 hours at room temperature. The solubility of the AN/HSA copolymer particles in various solvents was examined, and the results are summarized in Table 1.

As shown in Table 1, the AN/HSA copolymer particles maintain good resistance to most of organic solvents, and are tolerant to acid solution. In addition, the solubility of the copolymer particles changed significantly when HSA/AN molar ratio is more than 20:80. For example, those copolymer particles are slightly soluble in water.

TABLE 1

Chemoresistance and solution color of the AN/HSA copolymers in various solvents

| HSA/AN molar ratio | Chemoresistance in solvents, Solution color | | | | |
|---|---|---|---|---|---|
| | DMSO | DMF | THF | NMP | Acetone |
| 5/95 | Soluble, Cyan | Partially soluble, Blackish green | Partially soluble, Sage green | Partially soluble, Blue green | Insoluble |
| 10/90 | Soluble, Cyan | Soluble, Green | Partially soluble, Sage green | Soluble, Blue green | Insoluble |
| 20/80 | Soluble, Dark green | Soluble, Green | Partially soluble, Blackish green | Soluble, Dark green | Slightly soluble, Sage green |
| 30/70 | Soluble, Dark Green | Soluble, green | Partially soluble, Blackish green | Soluble, Dark green | Slightly soluble, Sage green |

| HSA/AN molar ratio | Chemoresistance in solvents, Solution color | | | | |
|---|---|---|---|---|---|
| | Toluene | Ethanol | m-Cresol | Acetonitrile | distilled water |
| 5/95 | Insoluble | Insoluble | Slightly soluble, Tawny | Insoluble | Insoluble |
| 10/90 | Insoluble | Slightly soluble, Yellow green | Slightly soluble, Tawny | Slightly soluble, Turquoise | Insoluble |
| 20/80 | Insoluble | Slightly soluble, Yellow green | Slightly soluble, Tawny | Slightly soluble, Turquoise | Insoluble |

TABLE 1-continued

Chemoresistance and solution color of the AN/HSA copolymers in various solvents

| | | | | |
|---|---|---|---|---|
| 30/70 | Insoluble | Slightly soluble, Yellow green | Partially soluble, Tawny | Partially soluble, Turquoise | Slightly soluble, light slate gray |

| | Chemoresistance in solvents, Solution color | | | |
|---|---|---|---|---|
| HSA/AN | HCl | | $NH_4OH$ | |
| molar ratio | 1M | 0.1M | 1M | 0.1M |
| 5/95 | Insoluble | Insoluble | Slightly soluble, light gray | Insoluble |
| 10/90 | Slightly soluble, light blue | Insoluble | Partially soluble, dim gray | Slightly soluble, dim gray |
| 20/80 | Slightly soluble, pale goldenrod | Insoluble | Partially soluble, dark khaki | Slightly soluble, dark khaki |
| 30/70 | Partially soluble, rose brown | Slightly soluble, rose brown | Soluble, sienna | Partial soluble, sienna |

Example 4

Morphological Features of the AN/HSA Copolymers

Additional AN/HSA copolymers were prepared using generally the same procedures described in Example 1. However, the AN/HSA molar ratio was 95:5 and 80:20, respectively. The size and morphology of those AN/HSA copolymer particles were observed using a Field Emission Scanning Electron Microscopy (FE-SEM) with an observation resolution of <2 nm. The SEM images are shown in FIG. 2a-f.

Figure 2A:
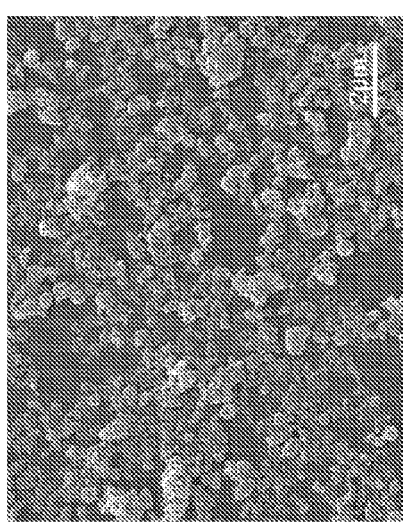
In FIGS. 2a-c, the AN/HSA copolymers were synthesized using the AN/HSA molar ratio of 95:5.
Figure 2B:
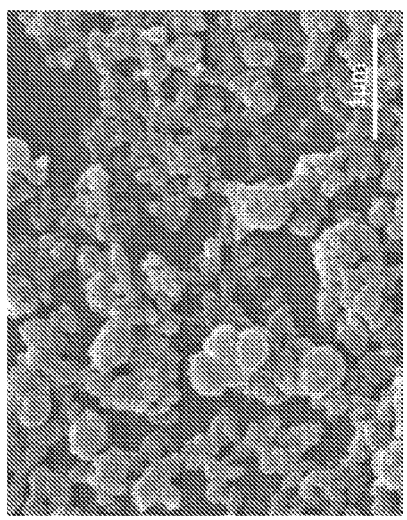
Figure 2C:
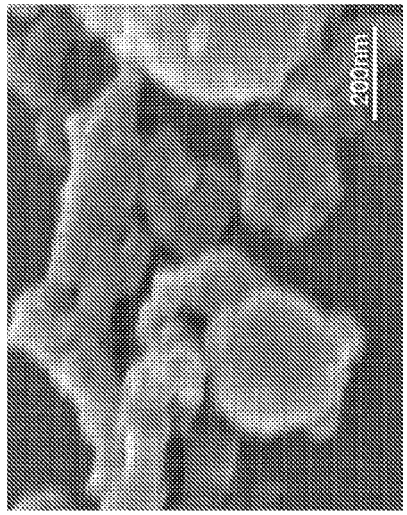
Figure 2D:
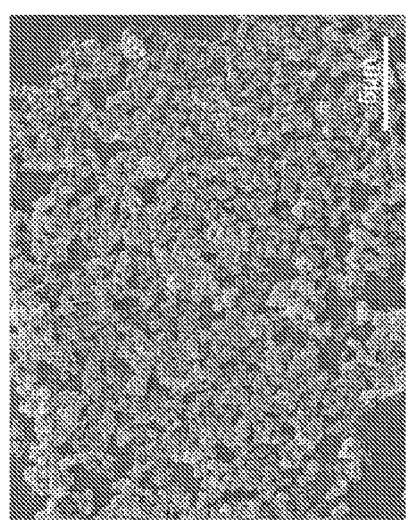
in FIG. 2d-f, the AN/HSA copolymers were synthesized using the AN/HSA molar ratio of 80:20.
Figure 2E:
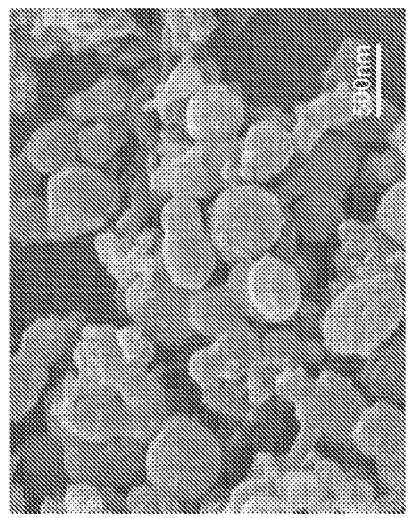
Figure 2F:
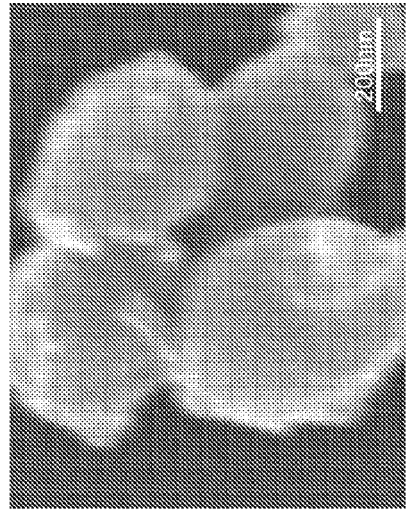

Morphological variations for the AN/HSA copolymers were observed with a change in the HSA feed content (FIG. 2a-f). As shown in FIG. 2a-f, short fibers morphology gradually changes to sphere and ellipsoid morphology with an increase of the HSA feed content. FIG. 2a-c show that that the copolymers were a component of partial short fibers and partial spheres when the AN/HSA molar ratio was 95:5, and that the spheres were not uniformed in such a condition. However, when the AN/HSA molar ratio was 80:20, the AN/HSA copolymer particles became more regular and uniform (FIG. 2d-f), and most of the particles are in sphere and ellipsoid.

Example 5

Size of the AN/HSA Copolymer Particles

Additional AN/HSA copolymers were prepared using generally the same procedures described in Example 1. However, the AN/HSA molar ratio varied from 100:0 to 70:30 (i.e., HSA feed content was increased from 0% to 30%). The size of those AN/HSA copolymer particles in water was analyzed with an LS230 laser particle-size analyzer. The results are shown in FIG. 3.

Figure 3:
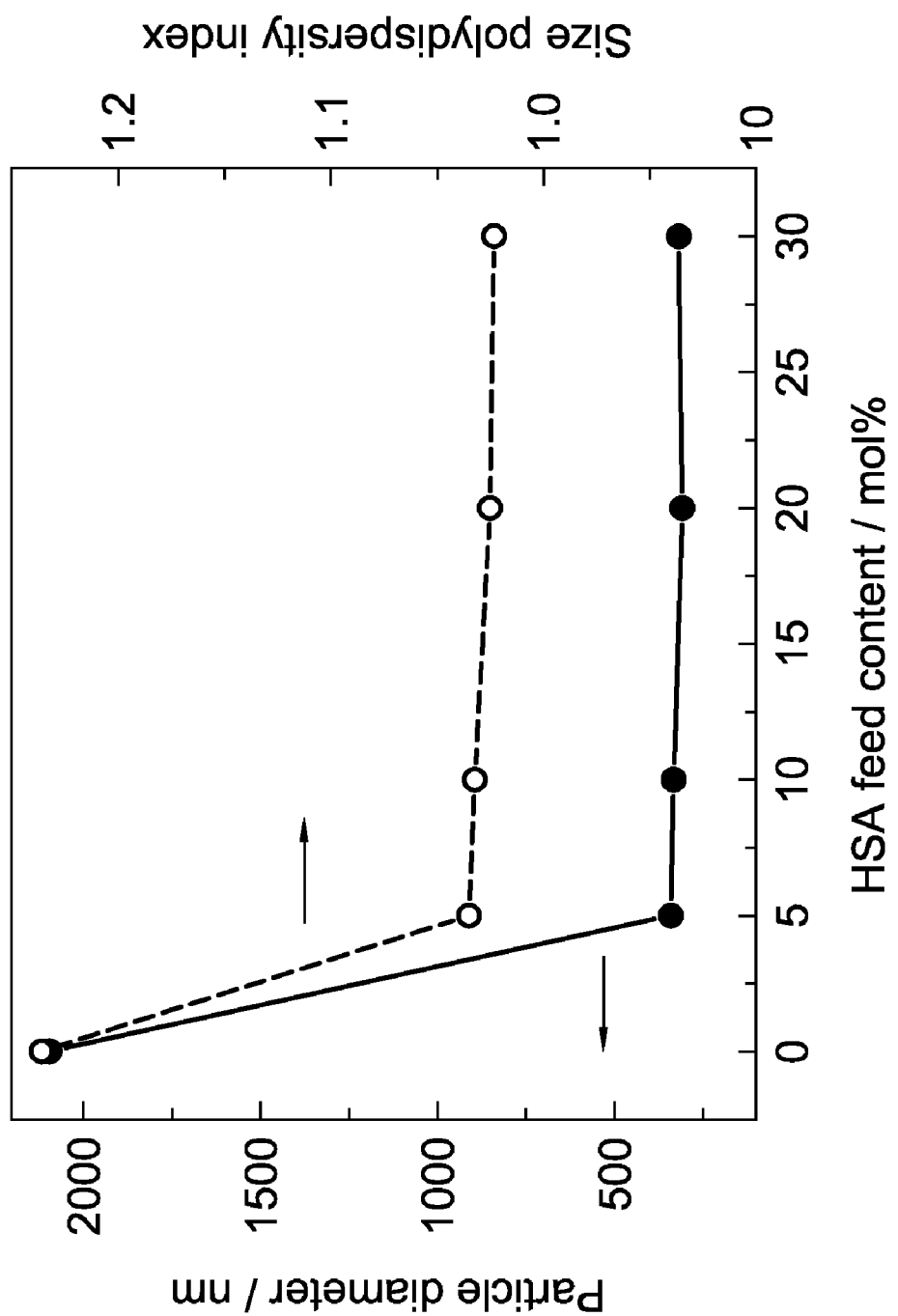
FIG. 3 shows the variation of the number-average diameter and size polydispersity index of the AN/HSA copolymer particles synthesized using various molar ratios of AN/HSA in 1.0 M HCl at 30° C. for 24 hours.

As shown in FIG. 3, compared to polyaniline, the number-average diameter of the AN/HSA copolymer particles that produced using the HSA/AN molar ratio of 20:80 dwindles from 2.09 μm to 308 nm, and the size polydispersity index changes from 1.24 to 1.03. This example shows that smaller amount of HSA monomer is needed for the formation of near nano-size copolymer particles with aniline as compared to other monomers (such as sulfodiphenylamine and sulfoanisidine), demonstrating that HSA is a robust modified monomer for polyaniline.

Example 6

Surface Area of the AN/HSA Copolymers

Figure 4:
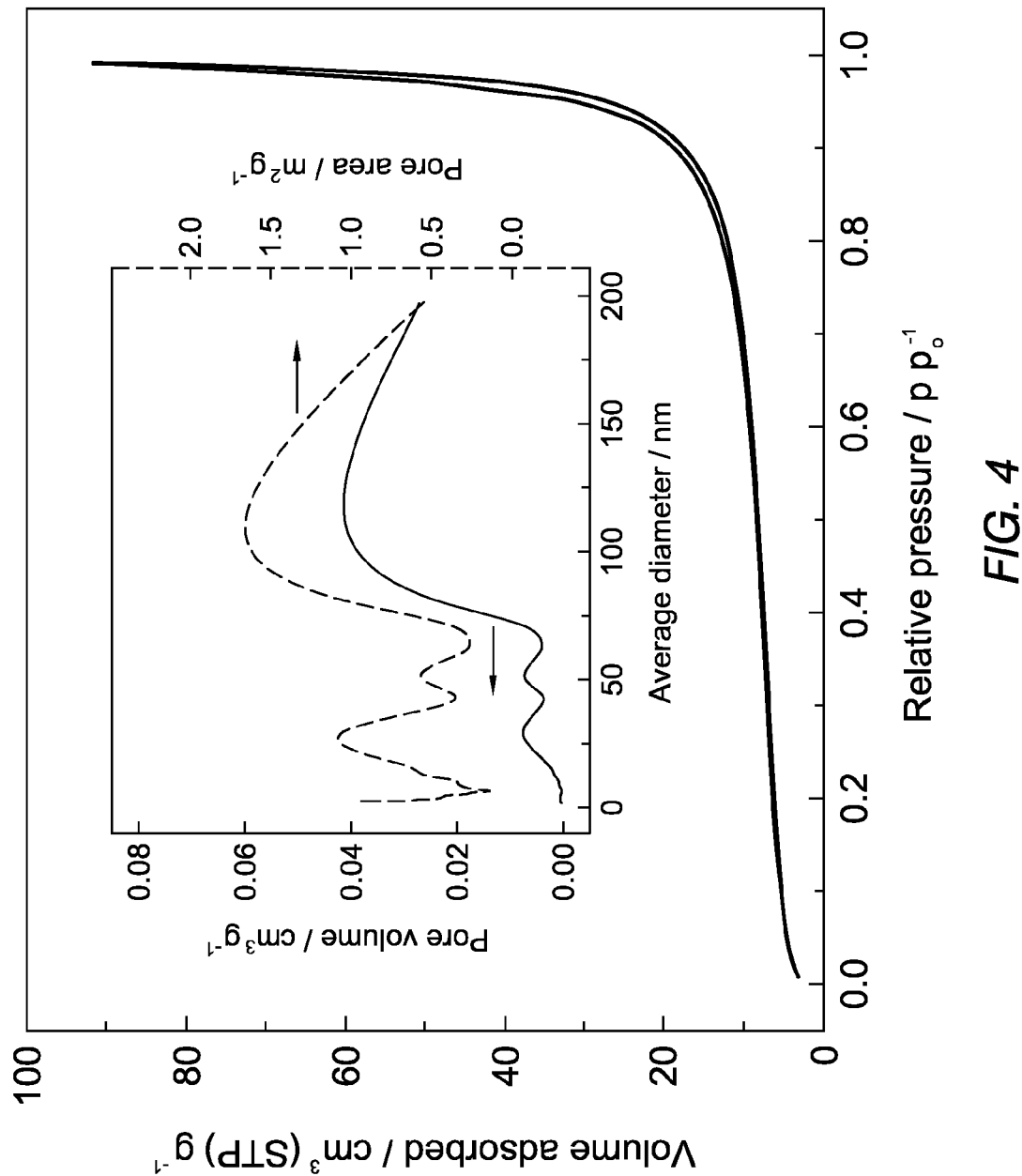
FIG. 4 shows the nitrogen adsorption-desorption isotherm plots of dry particles of the AN/HSA copolymers synthesized using the AN/HSA molar ratio of 80:20. The pore distribution curves are shown in the inset.

Additional AN/HSA copolymers were prepared using generally the same procedures described in Example 1. The surface areas of those AN/HSA copolymer particles were calculated by the Barrett-Emmett-Teller (BET) method. The pore volumes and pore-size distributions of those copolymer particles were derived from the adsorption branches of the isotherms using the Barrett-Joyner-Haladan (BJH) method. The results are shown in FIG. 4.

The BET specific area of those AN/HSA copolymer particles is 22.3 m$^2$/g, which is about 4.5 times as much as that of polydiaminonaphthalene and copolydiaminonaphthalene microparticles. Those AN/HSA submicroparticles are porous with average pore-diameter to be nearly 30 nm, and their total pore volume is nearly 0.141 cm$^3$/g. Without being bound to any particular theory, it is believed that the hydroxyl and sulfonic side-groups of HSA play an important role not only in the formation of the nanosphere, but also in pore morphology. Comparing with other oxidative polymer from aromatic amines, those AN/HSA particles have larger surface area and smaller diameters.

Example 7

IR Spectra

Additional AN/HSA copolymers were prepared using generally the same procedures described in Example 1. However, the AN/HSA molar ratio was 100:0, 95:5, 90:10, 80:20, and 70:30, respectively. The IR spectra for those AN/HSA copolymers were measured on Bruker Equinoxss/Hyperion2000 FT-1R spectrometer by the Attenuated Total Reflectance (ATR) method. The results are shown in FIG. 5.

Figure 5:
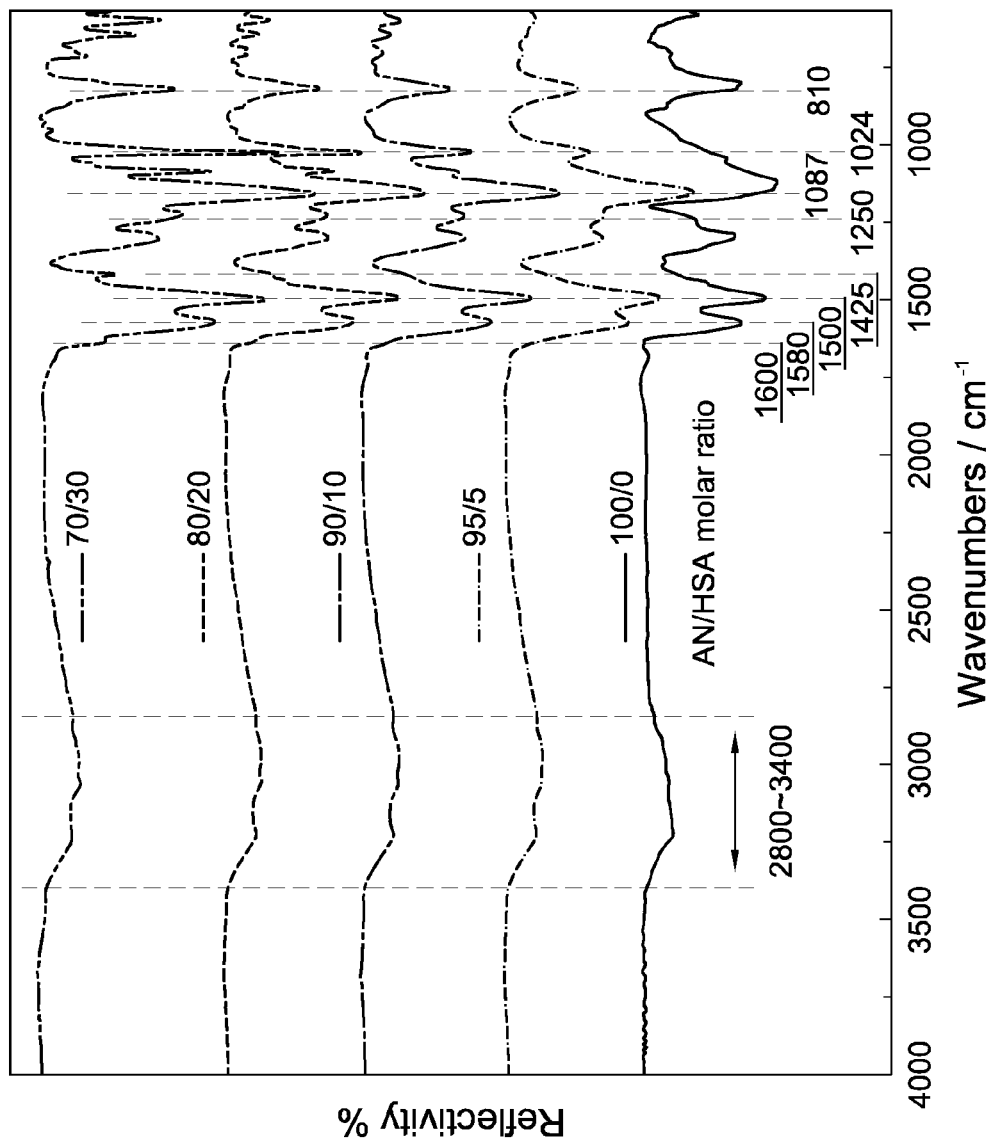
FIG. 5 shows the FT-IR spectra of the AN/HSA copolymers synthesized using various AN/HSA molar ratios.

As shown in FIG. 5, various peaks (e.g., peaks around 1250, 1087 and 1024 cm$^{-1}$ which correspond to the stretching vibration of C—O bond, asymmetric and symmetric stretching vibration of the S═O bond) are not found in pure polyaniline IR spectrum. These results demonstrate the existence of HSA moiety on the AN/HSA copolymer chains. In addition, the peaks between 600~750 cm$^{-1}$ that are attributed to the substituted aromatic rings of HSA units provide further evidence of successful copolymerization.

Example 8

UV-Vis Spectra

Additional AN/HSA copolymers were prepared using generally the same procedures described in Example 1. However, the AN/HSA molar ratio was 95:5, 90:10, 80:20, and 70:30, respectively. The UV-vis adsorption spectra for those AN/HSA copolymers in DMSO were measured on Perkin-Elmer Instruments Lambda 35 at a scanning rate of 480 nm/min. The results are shown in FIG. 6.

Figure 6:
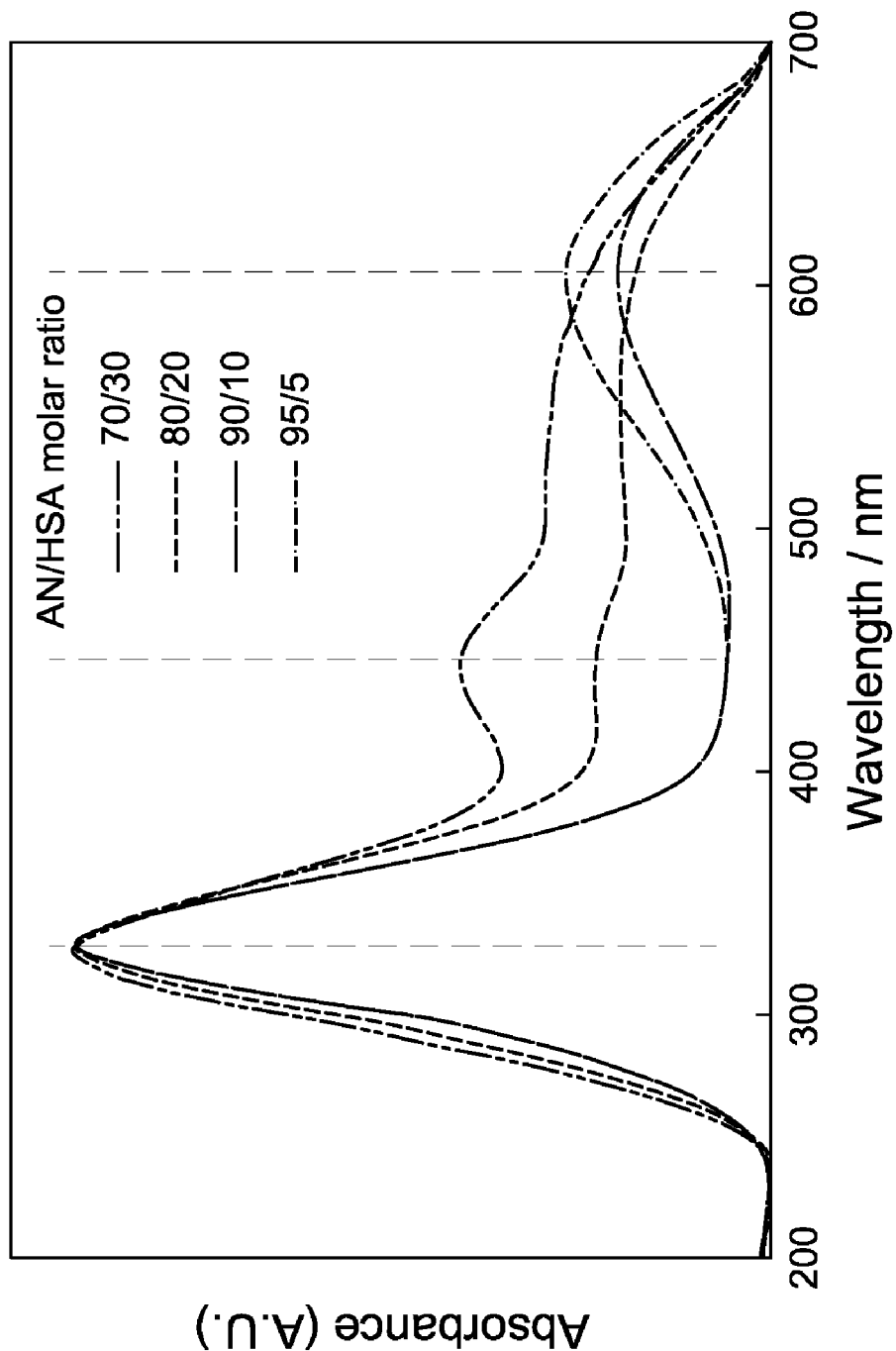
FIG. 6 shows the UV-Vis spectra of the AN/HSA copolymer synthesized with various molar ratio of AN/HSA in DMSO.

As shown in FIG. 6, the UV-vis spectra varies with a change in the AN/HSA molar ratio. In FIG. 6, the peaks appearing at 326 nm correspond to $\pi$-$\pi$* transition of the aromatic ring in copolymer chains, and the peaks around 610 nm correspond to the bipolarons n-$\pi$* transition of large $\pi$ conjugated structure. The peaks emerge in these two areas stand for the typical aromatic polymer, which is also in UV-vis spectrum of polyaniline. Further, the intensity of the peaks around 610 nm gradually degrade with the rising of the HSA content, which demonstrates that large side-groups in the HSA damage overlap effect of conjugative structure in the skeleton chains, and cause the decline of bulk electrical conductivity.

Example 9

Adsorption of Lead Ions

Additional AN/HSA copolymers were prepared using generally the same procedures described in Example 1. However, the AN/HSA molar ratio was 100:0, 95:5, 90:10, 80:20, and 70:30, respectively. The adsorptivity of lead ions for each of those AN/HSA copolymers was measured in a typical procedure including: adding AN/HSA copolymer particles in a 25 mL aqueous solution at 30° C.; filtering the copolymer particles from the solution; measuring the concentration for lead ions in the filtrate by inductively coupled plasma (ICP) or atomic adsorption spectrometry (AAS). In this example, 50 mg AN/HSA copolymer particles were added to the aqueous solution for 2 hours, and the initial concentration of lead ions in the aqueous solution was 200 mg/L. The results are shown in

TABLE 2

Adsorption of lead ions onto AN/HSA copolymers

| AN/HSA molar ratio | Amount of AN/HSA copolymers (mg) | Initial Pb$^{2+}$ concentration (mg/L) | Final Pb$^{2+}$ concentration (mg/L) | Adsorptivity (%) |
|---|---|---|---|---|
| 100/0 | 50 | 200 | 78.0 | 61.0 |
| 95/5 | 50 | 200 | 59.2 | 70.4 |
| 90/10 | 50 | 200 | 39.6 | 80.2 |
| 80/20 | 50 | 200 | 5.60 | 97.2 |
| 70/30 | 50 | 200 | 16.0 | 92.0 |

Example 10

Removal Kinetics of Lead Ions by the AN/HSA copolymers

AN/HSA copolymers were prepared using generally the same procedures described in Example 1. The adsorption capacity and adsorptivity of lead ions onto each of those AN/HSA copolymers was measured according to the general procedure described in Example 9.

Figure 7:
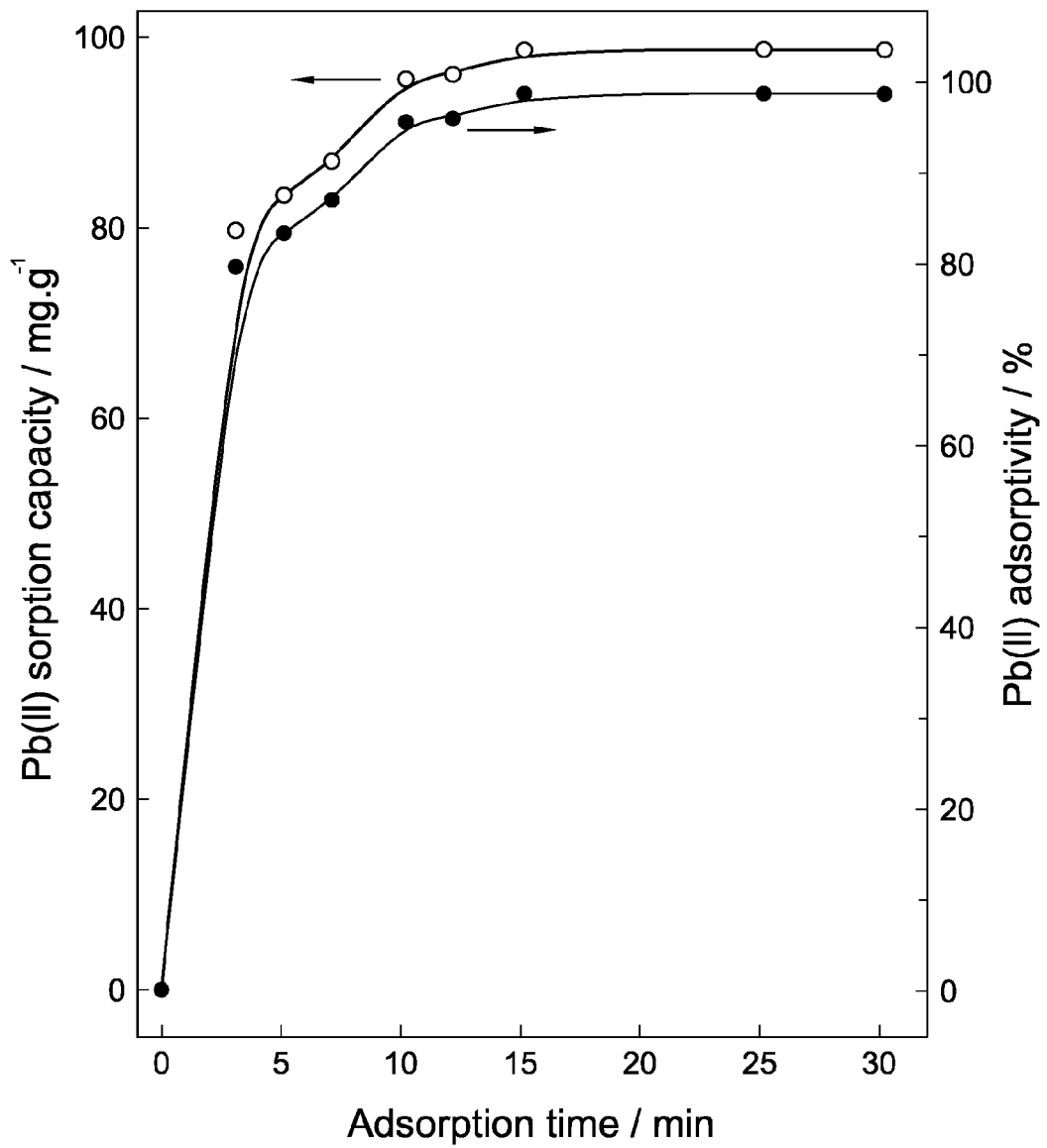
FIG. 7 shows the sorption capacity and adsorptivity of Pb(II) by 50 mg AN/HSA copolymer synthesized using the AN/HSA molar ratio of 80:20 in 25 mL $Pb(NO_3)_2$ solution at initial Pb(II) concentration of 200 mg/L.

In one set of experiments, 50 mg AN/HSA copolymer particles were added to 25 mL Pb(NO$_3$)$_2$ solution for various period of time, and the initial concentration of lead ions was 200 mg/L. The results are shown in FIG. 7.

In another set of experiments, 50 mg AN/HSA copolymer particles were also added to 25 mL Pb(NO$_3$)$_2$ solution for various periods of time, but the initial concentration of lead ions was 1 mg L$^{-1}$. The results are shown in Table 3 and FIG. 8.

TABLE 3

Kinetics of removal percentage of lead ions

| Adsorption time (minute) | Amount of AN/HSA copolymers (mg) | Initial Pb$^{2+}$ concentration (mg/L) | Final Pb$^{2+}$ concentration (mg/L) | Adsorptivity (%) |
|---|---|---|---|---|
| 5 | 5 | 1 | 0.479 | 52.1 |
| 10 | 5 | 1 | 0.277 | 72.3 |
| 15 | 5 | 1 | 0.155 | 84.5 |
| 20 | 5 | 1 | 0.087 | 91.3 |
| 30 | 5 | 1 | 0.024 | 97.6 |
| 40 | 5 | 1 | 0.003 | 99.7 |
| 50 | 5 | 1 | 0.003 | 99.7 |
| 60 | 5 | 1 | 0.003 | 99.7 |
| 75 | 5 | 1 | 0.003 | 99.7 |

Figure 8:
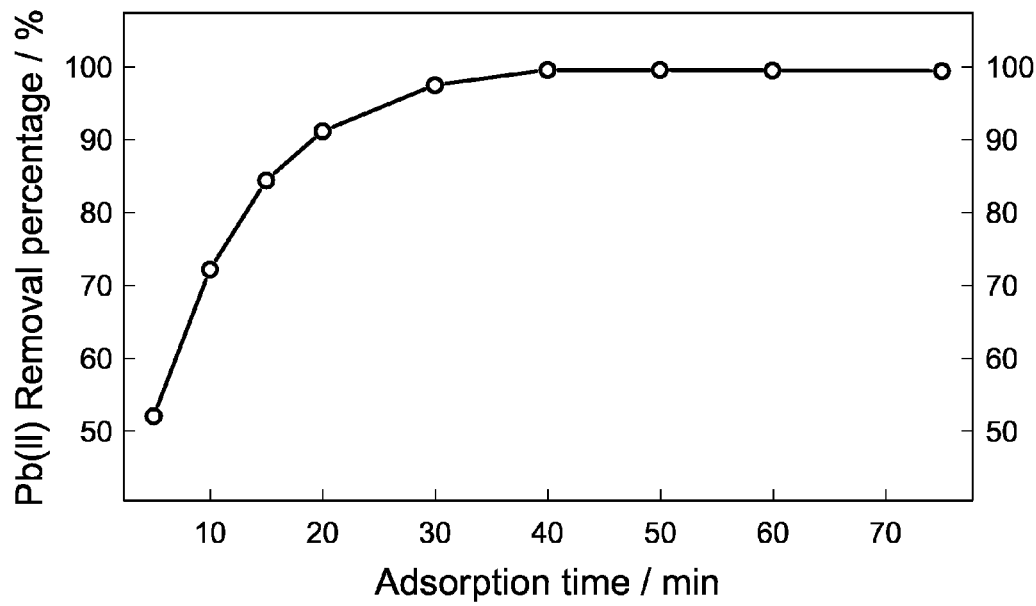
FIG. 8 shows the kinetics of removal percentage of Pb(II) by the AN/HSA copolymer at initial Pb(II) concentration of 1 mg/L (equals 1 ppm).

FIG. 7 shows that when the lead ions were at the concentration of 200 mg L$^{-1}$, the adsorption rate of the lead ions onto the AN/HSA copolymers is high, and it takes only 15 minutes to reach the adsorption equilibrium with the removal percentage of 98.7%. Table 3 and FIG. 8 show that at lower concentration (the lead ions were at 1 mg L$^{-1}$), the removal percentage of lead ions by the AN/HSA copolymers can reach up to over 99.5% after 40 minutes, further demonstrating that the AN/HSA copolymers are fast and efficient adsorbent for metal ions.

Example 11

Adsorption of Lead Ions at ppm and ppb Level

Figure 9:
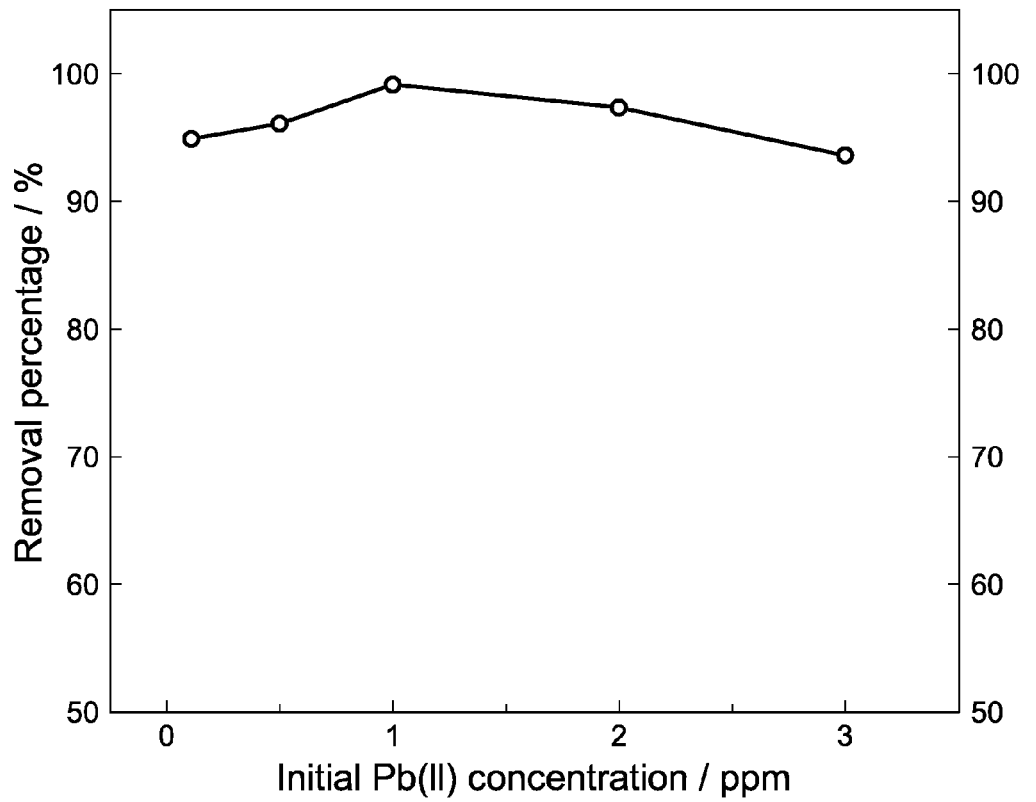
FIG. 9 shows the removal percentage of Pb(II) by the AN/HSA copolymer at ppb/ppm level.

Additional AN/HSA copolymers were prepared using generally the same procedures described in Example 1. Removal percentage of lead ions at the initial concentration at ppm and ppb level by the AN/HSA copolymers synthesized using the molar ratio of the HSA monomer to the AN monomer of 20:80 were studied. The results are shown in FIG. 9 and Table 4.

TABLE 4

The removal percentage of lead ions

| Adsorption time (hour) | Amount of AN/HSA copolymers (mg) | Initial Pb$^{2+}$ concentration (mg/L) | Final Pb$^{2+}$ concentration (mg/L) | Adsorptivity (%) |
|---|---|---|---|---|
| 1 | 5 | 0.1 | 0.0051 | 94.9 |
| 1 | 5 | 0.5 | 0.0195 | 96.1 |
| 1 | 5 | 1.0 | 0.008 | 99.2 |
| 1 | 5 | 2.0 | 0.052 | 97.4 |
| 1 | 5 | 3.0 | 0.189 | 93.7 |

As shown in FIG. 9 and Table 4, the removal percentage of lead ions at ppm~ppb level by the AN/HSA copolymers can reach up to 100%, demonstrating that the AN/HSA copolymers are highly efficient adsorbents for metal ions.

Example 12

Competitive Adsorption of Metal Ions

Additional AN/HSA copolymers were prepared using generally the same procedures described in Example 1. The adsorptivity of those AN/HSA copolymers for various metal ions at 30° C. for 1 hour was measured according to the general procedure described in Example 9. In one set of experiment, the adsorptivity of the copolymer for one metal ion was determined using solutions containing only the corresponding metal ion at 200 mg/L. In another set of experiment, the adsorptivity of the copolymer for one metal ion was determined using a mixed solution containing all seven metal ions, where the concentration of each of the metal ions is 200 mg/L. The results are shown in Table 5 and FIG. 10.

TABLE 5

Adsorption ability of AN/HSA copolymer for various heavy metal ions in separate and mixed solutions

| Metal ion solution | Amount of AN/HSA copolymers (mg) | Adsorption Time (hour) | Initial Metal ion concentration (mg/L) | Final metal ion concentration (mg/L) individual | Final metal ion concentration (mg/L) Co-existed | percentage reduction (%) individual | percentage reduction (%) Co-existed |
|---|---|---|---|---|---|---|---|
| $Hg(NO_3)_2$ | 50 | 6 | 200 | 0.26 | 13.58 | 99.9 | 93.2 |
| $Pb(NO_3)_2$ | 50 | 6 | 200 | 5.58 | 19.7 | 97.2 | 90.2 |
| $AgNO_3$ | 50 | 6 | 200 | 9.4 | — | 95.3 | — |
| $Zn(NO_3)_2$ | 50 | 6 | 200 | 10.9 | 32.46 | 94.6 | 83.8 |
| $Cu(NO_3)_2$ | 50 | 6 | 200 | 17.06 | 27.16 | 91.5 | 86.4 |
| $Cd(NO_3)_2$ | 50 | 6 | 200 | 27.42 | 41.26 | 86.3 | 79.4 |
| $FeCl_3$ | 50 | 6 | 200 | 85.36 | 113.42 | 57.3 | 43.3 |

Figure 10:
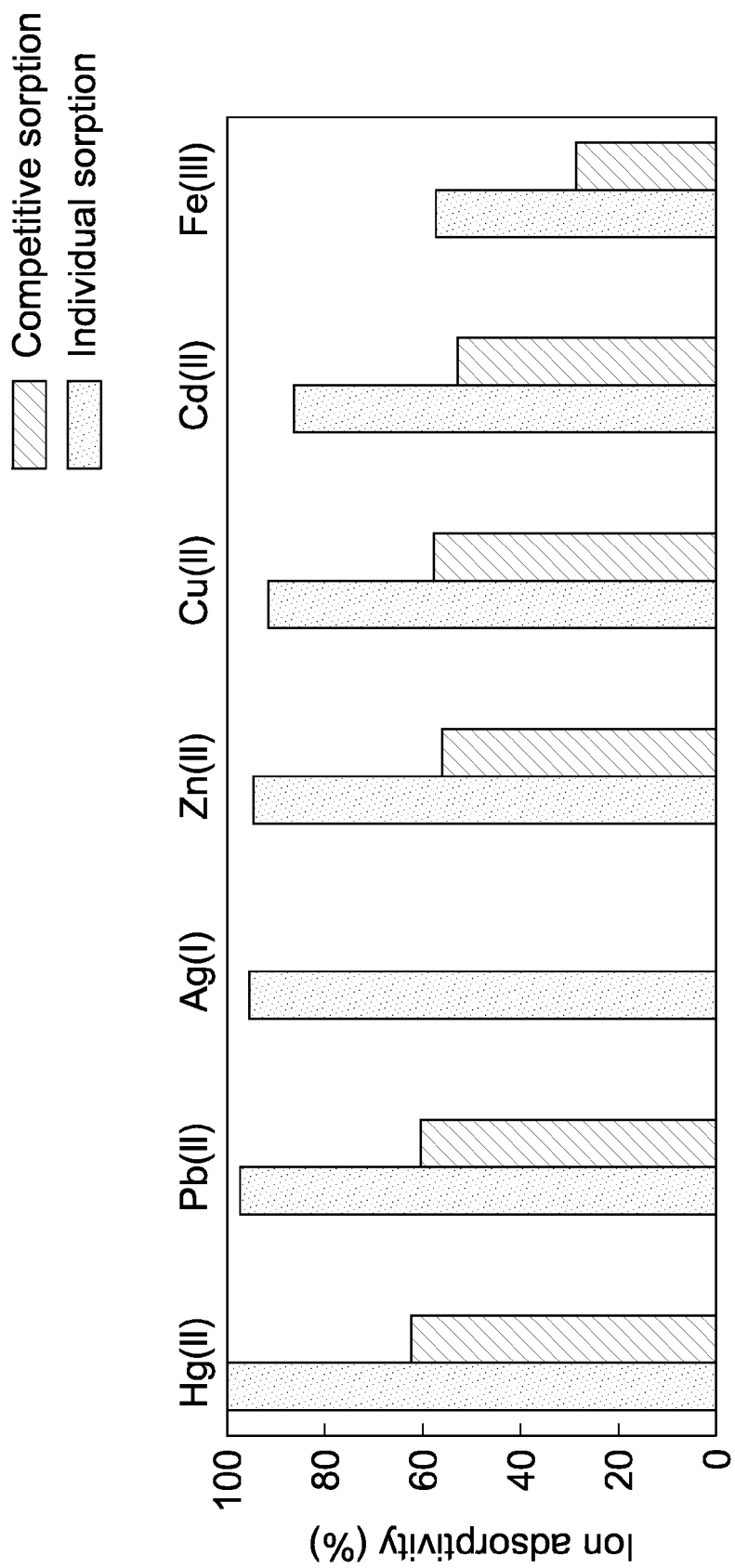
FIG. 10 shows the adsorption ability of various metal ions by the AN/HSA copolymer in separate or mixed solutions with initial metal ion concentration of 200 mg/L.

As shown in Table 5 and FIG. 10, the removal percentage of the copolymer for many metal ions is over 90% when no other metal ions are present. The removal percentage still maintains to be over 80% for many metal ions when other types of metal ions are present. This Example shows the AN/HSA copolymers are efficient and anti-interfering adsorbents for various metal ions.

Example 13

Competitive Adsorption of Metal Ions

Additional AN/HSA copolymers were prepared using generally the same procedures described in Example 1. The adsorptivity of various metal ions in a mixed solution for those AN/HSA copolymers at 30° C. for 1 hour was measured according to the general procedure described in Example 8. In the mixed solution, the concentration of each of the eight metal ions: Na(I), Ca(II), Cd(II), Cu(II), Zn(II), Pb(II), Hg(II), and Fe(III), was 20 mg/L (i.e., 20 ppm).

Figure 11:
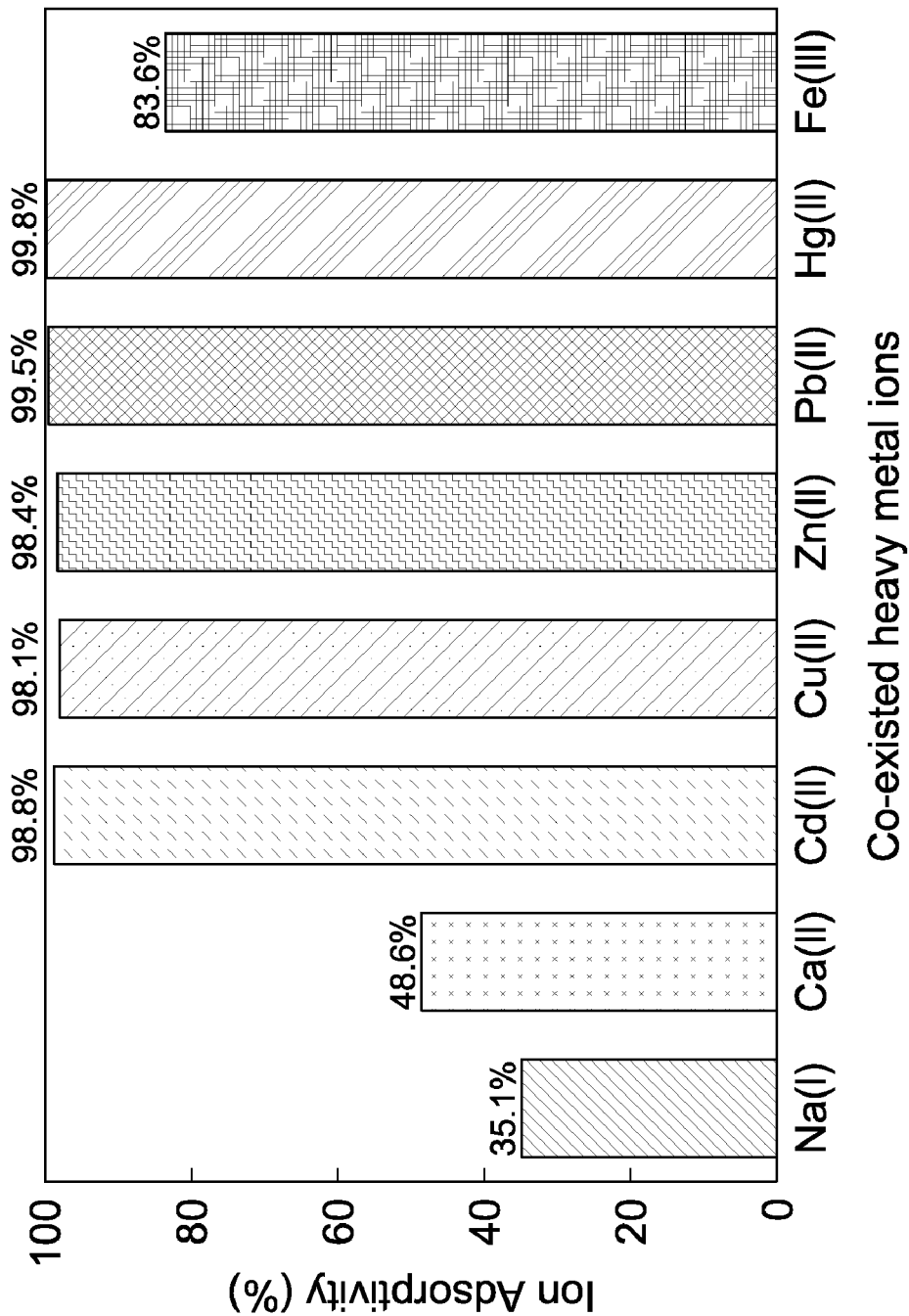
FIG. 11 shows the competitive adsorption of various co-existing metal ions by 50 mg AN/HSA copolymer particles in 25 mL of mixed solution with initial concentration of 20 mg/L for each metal ion.

In one set of experiments, 50 mg AN/HSA copolymer particles were added into 25 mL of the mixed solution to determine adsorptivity. The results are shown in Table 6 and FIG. 11.

TABLE 6

Competitive adsorption of co-existing metal ions using 50 mg AN/HSA copolymer particles

| Metal ion solution | Amount of AN/HSA copolymers (mg) | Initial Metal ion concentration (mg/L) | Final metal ion concentration (mg/L) | percentage reduction (%) |
|---|---|---|---|---|
| $NaNO_3$ | 50 | 20 | 13.0 | 35.1 |
| $Ca(NO_3)_2$ | 50 | 20 | 10.3 | 48.6 |
| $Cd(NO_3)_2$ | 50 | 20 | 0.248 | 98.8 |
| $Cu(NO_3)_2$ | 50 | 20 | 0.376 | 98.1 |
| $Zn(NO_3)_2$ | 50 | 20 | 0.33 | 98.4 |
| $Pb(NO_3)_2$ | 50 | 20 | 0.108 | 99.5 |
| $Hg(NO_3)_2$ | 50 | 20 | 0.046 | 99.8 |
| $FeCl_3$ | 50 | 20 | 3.27 | 83.6 |

Figure 12:
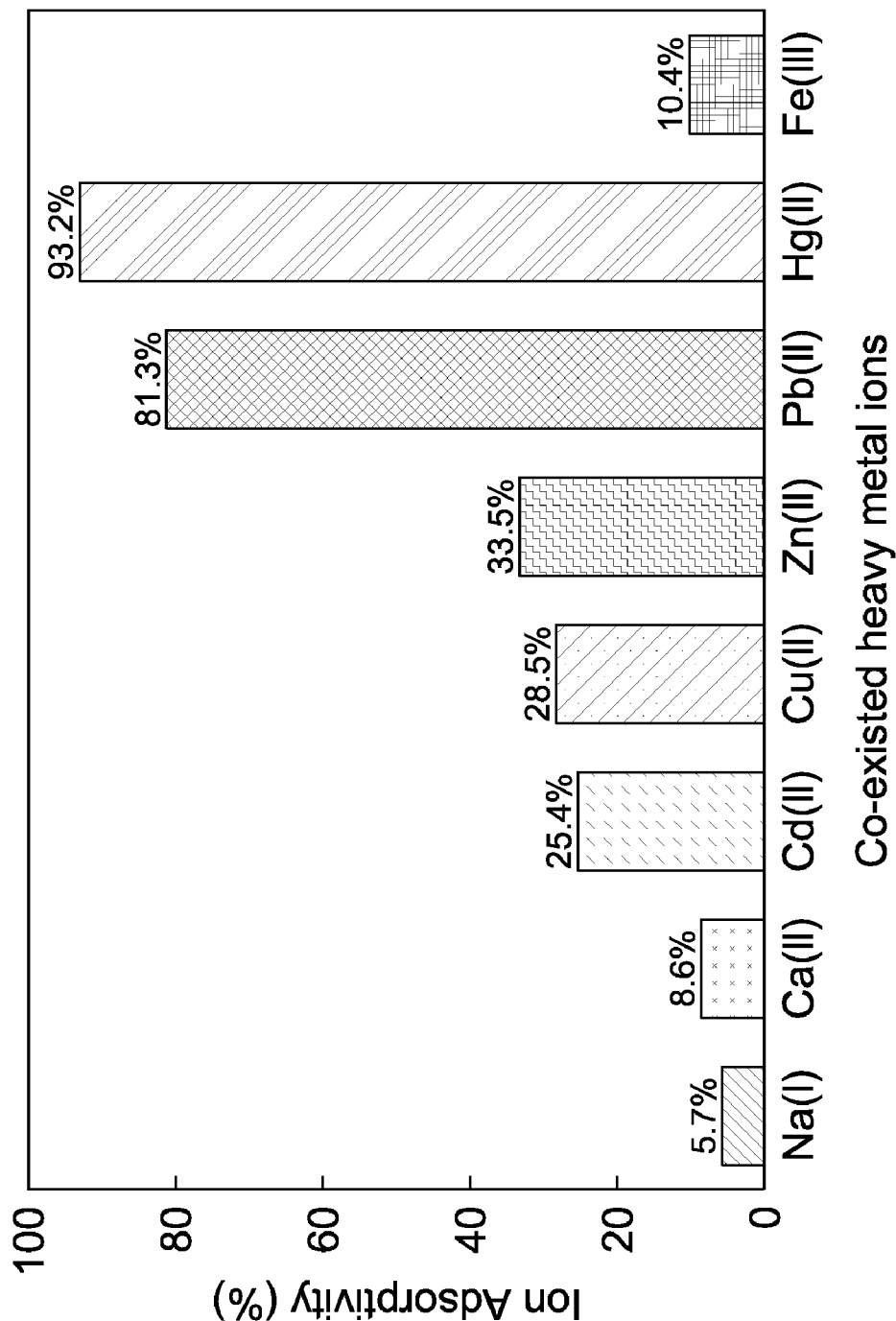
FIG. 12 shows the competitive adsorption of various co-existing metal ions by 5 mg AN/HSA copolymer particles in 25 mL of mixed solution with initial concentration of 20 mg/L for each metal ion.

In another set of experiments, 5 mg AN/HSA copolymer particles were added into 25 mL of the mixed solution to determine adsorptivity. The results are shown in Table 7 and FIG. 12.

TABLE 7

Competitive adsorption of co-existing metal ions using 5 mg AN/HSA copolymer particles

| Metal ion solution | Amount of AN/HSA copolymers (mg) | Initial Metal ion concentration (mg/L) | Final metal ion concentration (mg/L) | percentage reduction) (%) |
|---|---|---|---|---|
| $NaNO_3$ | 5 | 20 | 18.9 | 5.71 |
| $Ca(NO_3)_2$ | 5 | 20 | 18.3 | 8.64 |
| $Cd(NO_3)_2$ | 5 | 20 | 14.9 | 25.4 |
| $Cu(NO_3)_2$ | 5 | 20 | 14.3 | 28.5 |
| $Zn(NO_3)_2$ | 5 | 20 | 13.3 | 33.5 |
| $Pb(NO_3)_2$ | 5 | 20 | 3.73 | 81.3 |
| $Hg(NO_3)_2$ | 5 | 20 | 1.36 | 93.2 |
| $FeCl_3$ | 5 | 20 | 17.9 | 10.4 |

This Example further demonstrates that the AN/HSA copolymers are efficient adsorbents for various metal ions with high anti-interfering capability.

Example 14

Purification of Wastewater

AN/HSA copolymers were prepared according to the procedures described in Example 1 and used to removing metal ions from wastewater from a non-ferrous metal factory. In this example, every 25 mL wastewater was treated with 50 mg AN/HSA copolymers.

In one set of experiments, after pretreatment by centrifugation to remove solids, the wastewater was treated by the copolymers alone. In another set of experiments, after pretreatment by centrifugation to remove solids, the wastewater was pre-treated by 0.5M NaOH before using the copolymers to adsorb metal ions. In those experiments, 3 mL of 0.5M NaOH was added to 50 mL of wastewater, and the wastewater was stirred for 2 to 10 minutes before being filtered for further adsorption treatment by the AN/HSA copolymers. The concentration of various metal ions in the wastewater before and after purification by the AN/HSA copolymers was determined by inductively coupled plasma (ICP) or atomic adsorption spectrometry (AAS). The adsorption results are summarized in Tables 8 and 9.

TABLE 8

Summary of Metal Ion Removal Efficiency in Wastewater using the AN/HSA Copolymer Alone

| Metal Ions | Concentration in untreated wastewater (mg $L^{-1}$) | Concentration after adsorption treatment (mg $L^{-1}$) | Removal percentage (%) |
|---|---|---|---|
| Mg(II) | 152.5 | 42.23 | 72.3 |
| Cr(III, VI) | 1.417 | 0.543 | 61.7 |
| Mn(II) | 32.03 | 2.627 | 91.8 |
| Fe(III) | 100.2 | 43.05 | 57.0 |
| Ni(II) | 5.495 | 0.78 | 85.8 |
| Cu(II) | 123.4 | 5.19 | 85.8 |
| Zn(II) | 102.5 | 5.623 | 94.5 |
| Cd(II) | 0.754 | 0.096 | 87.3 |
| Hg(II) | 1.073 | 0.021 | 98.0 |
| Pb(II) | 13.26 | 0.232 | 98.3 |

TABLE 9

Summary of Metal Ion Removal Efficiency by the AN/HSA Copolymer in Wastewater Pretreated by NaOH

| Metal Ions | Concentration in untreated wastewater (mg $L^{-1}$) | Concentration after NaOH treatment (mg $L^{-1}$) | Concentration after NaOH and adsorption treatment (mg $L^{-1}$) | Removal percentage by the copolymer (%) | Total Removal percentage (%) |
|---|---|---|---|---|---|
| Mg(II) | 152.5 | 2.64 | 1.19 | 54.9 | 99.1 |
| Ca(II) | 5.03 | 4.28 | 2.99 | 30.1 | 34.6 |
| Cr(III, VI) | 1.417 | 0.012 | 0.009 | 25.0 | 99.3 |
| Mn(II) | 32.03 | 2.54 | 0.44 | 82.7 | 98.5 |
| Fe(III) | 100.2 | 0.011 | 0.003 | 72.7 | 99.9 |
| Ni(II) | 5.495 | 0.378 | 0.18 | 52.4 | 96.4 |
| Cu(II) | 123.4 | 0.258 | 0.15 | 41.9 | 99.9 |
| Zn(II) | 102.5 | 0.133 | 0.075 | 43.6 | 99.9 |
| Cd(II) | 0.754 | 0.717 | 0.21 | 70.7 | 69.4 |
| Hg(II) | 1.073 | 0.479 | 0.013 | 97.3 | 98.7 |
| Pb(II) | 13.26 | 2.02 | 0.051 | 97.5 | 99.6 |

As shown in Tables 8 and 9, the pretreatment of NaOH is not sufficient to reduce the concentration of various toxic metal ions, such as Hg(II), Pb(II), Cd(II), Cr (III, VI) and Ni (II), to a safe level. AN/HSA copolymer particles significantly reduce the concentration of various metal ions in the wastewater sample after the NaOH pretreatment. This example demonstrates that the AN/HSA copolymers can be used to remove various metal ions from and thus purify polluted environmental and industrial wastewaters.

Example 15

Regeneration of AN/HSA Copolymers for Adsorption of Metal Ions

AN/HSA copolymers were prepared according to the procedures described in Example 1. The adsorptivity of lead ions for those AN/HSA copolymers was measured in a typical procedure described in Example 9. In this example, the copolymers were added to the sample with $Pb^{2+}$ at 200 mg/L for 6 hours. After adsorption, the AN/HSA copolymers containing adsorbed lead ions were separated from the solution and treated with 0.05M EDTA desorption eluant for 1 hour to remove lead ions from the copolymers. Following desorption, the regenerated AN/HSA copolymers were tested again for adsorptivity of lead ions according to the procedure described in Example 8 and the adsorption time was 6 hours. The cycle of adsorption-desorption was repeated 5 times to determine the reversibility of the copolymer in removing metal ions. The measured adsorptivity of lead ions by the AN/HSA copolymers in each cycle is shown in Table 10 and FIG. 13.

TABLE 10

Adsorptivity of the AN/HSA copolymers During 5 Cycles of Regeneration

| No. of cycle | Initial $Pb^{2+}$ concentration (mg/L) | Amount of AN/HSA copolymers (mg) | Adsorptivity (%) | Concentration of EDTA (M) | Volume of EDTA (mL) | Desorptivity (%) |
|---|---|---|---|---|---|---|
| 1 | 200 | 50 | 97.2 | 0.05 | 25 | 93.0 |
| 2 | 200 | 50 | 92.5 | 0.05 | 25 | 87.2 |
| 3 | 200 | 50 | 90.2 | 0.05 | 25 | 83.0 |
| 4 | 200 | 50 | 88.1 | 0.05 | 25 | 80.2 |
| 5 | 200 | 50 | 85.0 | 0.05 | 25 | 77.5 |

Figure 13:
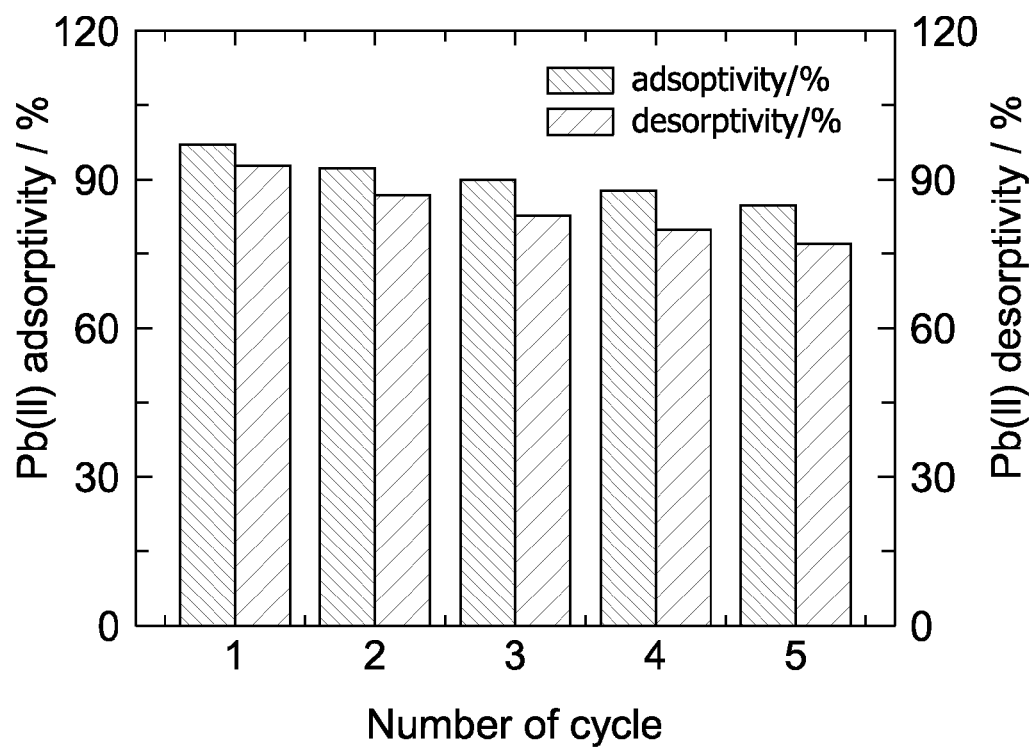
FIG. 13 shows the Pb(II) adsorption and desorption by the AN/HSA copolymer.

As shown in Table 10 and FIG. 13, even after 4 cycles of adsorption-desorption, the AN/HSA copolymers still maintain an adsorptivity close to 90% compared to the fresh copolymers, which is significantly better than many of the adsorbents that have been reported to be out of work after 3 cycles. This example demonstrates that chelating agents such as EDTA can effectively regenerate the AN/HSA copolymer adsorbents, and the AN/HSA copolymers can be regenerated and reusable as high-efficient adsorbent for metal ions.

What is claimed is:

1. A method for removing a metal ion from a sample, the method comprising:
   (a) providing an untreated sample suspected of containing the metal ion; and
   (b) contacting the untreated sample and a composition to form a treated sample, wherein the composition comprises a copolymer comprising at least one optionally substituted 2-hydroxy-5-sulfonic aniline as a first monomer unit and at least one aniline as a second monomer unit.

2. The method of claim 1, wherein, the first monomer unit is represented by Formula I:

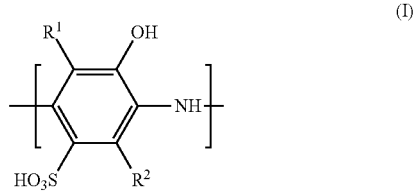

(I)

wherein $R^1$ is hydrogen or an electron-donating group, and $R^2$ is hydrogen or an electron-donating group.

3. The method of claim 1, wherein the metal ion is a heavy metal ion.

4. The method of claim 1, wherein the metal ion is Pb(II) or Hg(II).

5. The method of claim 1, wherein the metal ion is a noble metal ion.

6. The method of claim 1, wherein the metal ion is Ag(I).

7. The method of claim 1, wherein the metal ion is selected from the group consisting of Cd(II), Cu(II), Zn(II), Pb(II), Hg(II), and Fe(III).

8. The method of claim 1, wherein the untreated sample is wastewater.

9. The method of claim 1, wherein the concentration of the metal ion in the untreated sample is no more than about 200 g/L.

10. The method of claim 9, wherein the concentration of the metal ion in the untreated sample is from about 1 ng/L to about 200 mg/L.

11. The method of claim 1, wherein the concentration of the metal ion in the untreated sample is higher than the concentration of the metal ion in the treated sample.

12. The method of claim 11, wherein the concentration of the metal ion in the untreated sample is at least about 5 times higher than the concentration of the metal ion in the treated sample.

13. The method of claim 12, wherein the concentration of the metal ion in the untreated sample is at least about 10 times higher than the concentration of the metal ion in the treated sample.

14. The method of claim 13, wherein the concentration of the metal ion in the untreated sample is at least about 20 times higher than the concentration of the metal ion in the treated sample.

15. The method of claim 1, wherein the concentration of the metal ion in the treated sample is less than about 30% of the concentration of the metal ion in the untreated sample.

16. The method of claim 15, wherein the concentration of the metal ion in the treated sample is less than about 15% of the concentration of the metal ion in the untreated sample.

17. The method of claim 16, wherein the concentration of the metal ion in the treated sample is less than about 1% of the concentration of the metal ion in the untreated sample.

18. The method of claim 1, further comprising separating the copolymer from the treated sample.

19. The method of claim 18, further comprising contacting the separated copolymer with a chelating agent to form a regenerated copolymer, wherein the amount of metal ions in the regenerated copolymer is less than the amount of metal ions in the separated copolymer.

20. The method of claim 19, further comprising contacting a second untreated sample suspected of containing metal ions with the regenerated copolymer.

21. The method of claim 19, wherein the chelating agent is a polyamino carboxylic acid.

22. The method of claim 19, wherein the chelating agent is selected from ethylenediaminetetraacetic acid (EDTA), diethylenetriaminepentaacetic acid (DTPA), N-(2-hydroxyethyl)ethylenediamine-N,N',N'-triacetic acid (HEDTA), glycol-bis-(2-aminoethylether)-N,N,N',N'-tetraacetic acid (EGTA), ethylenediamine-N,N'-bis((2-hydroxyphenyl)acetic acid) (EDDHA), and mixtures thereof.

* * * * *

UNITED STATES PATENT AND TRADEMARK OFFICE
CERTIFICATE OF CORRECTION

PATENT NO. : 8,361,323 B2
APPLICATION NO. : 13/481656
DATED : January 29, 2013
INVENTOR(S) : Huang et al.

It is certified that error appears in the above-identified patent and that said Letters Patent is hereby corrected as shown below:

On the title page, item (75), under "Inventors", in Column 1, Line 1, delete "Meirong" and insert -- Mei-rong --, therefor.

On the title page, item (75), under "Inventors", in Column 1, Line 2, delete "Xingui" and insert -- Xin-gui --, therefor.

On the title page, item (63), under "Related U.S. Application Data", in Column 1, Line 1, delete "13/510,709," and insert -- 13/510,709 filed on May 18, 2012, --, therefor.

On the title page, item (56), under "PUBLICATIONS", in Column 2, Line 34, delete "Hg2+" and insert -- $Hg^{2+}$ --, therefor.

On title page 2, item (56), under "PUBLICATIONS", in Column 1, Line 38, delete "Fe3O4" and insert -- $Fe_3O_4$ --, therefor.

On title page 2, item (56), under "PUBLICATIONS", in Column 1, Line 53, delete "naostrutured" and insert -- nanostructured --, therefor.

In the Drawings

In Fig. 3, Sheet 3 of 12, delete " 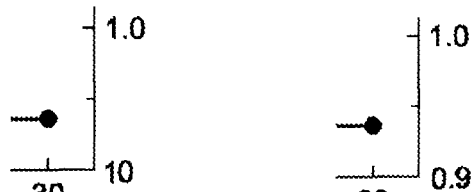 " and insert -- -- therefor.

In Fig. 6, Sheet 6 of 12, delete "Absorbance" and insert -- Adsorbance --, therefor.

Signed and Sealed this
Twenty-third Day of April, 2013

Teresa Stanek Rea
*Acting Director of the United States Patent and Trademark Office*

In the Specifications

In Column 3, Line 11, delete "R'" and insert -- $R^1$ --, therefor.

In Column 4, Line 14, delete "FIG." and insert -- FIGS. --, therefor.

In Column 5, Line 35, delete "New York" and insert -- New York, --, therefor.

In Column 7, Line 58, delete "such" and insert -- such as --, therefor.

In Column 14, Line 58, delete "An/HSA" and insert -- AN/HSA --, therefor.

In Column 17, Line 32, delete "FIG." and insert -- FIGS. --, therefor.

In Column 17, Lines 34-35, delete "(FIG. 2a-f). As shown in FIG. 2a-f," and insert -- (FIGS. 2a-f). As shown in FIGS. 2a-f, --, therefor.

In Column 17, Line 37, delete "FIG." and insert -- FIGS. --, therefor.

In Column 17, Line 43, delete "(FIG." and insert -- (FIGS. --, therefor.

In Column 18, Line 57, delete "FT-1R" and insert -- FT-IR --, therefor.

In Column 22, Line 46, in Table 7, delete "reduction)" and insert -- reduction --, therefor.